(12) United States Patent
Blank et al.

(10) Patent No.: US 11,307,739 B2
(45) Date of Patent: Apr. 19, 2022

(54) DYNAMIC MULTI-CHANNEL PUBLISHER

(71) Applicant: salesforce.com, inc., San Francisco, CA (US)

(72) Inventors: Rachel Ellie Blank, Concord, CA (US); George Edward Cliff, San Francisco, CA (US); Max St. Clair Wenger, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 46 days.

(21) Appl. No.: 16/828,722

(22) Filed: Mar. 24, 2020

(65) Prior Publication Data

US 2021/0149530 A1 May 20, 2021

Related U.S. Application Data

(60) Provisional application No. 62/936,127, filed on Nov. 15, 2019.

(51) Int. Cl.
  *G06F 3/0482* (2013.01)
  *G06F 3/04817* (2022.01)
  *H04L 51/52* (2022.01)
  *H04L 51/04* (2022.01)

(52) U.S. Cl.
  CPC ........ *G06F 3/0482* (2013.01); *G06F 3/04817* (2013.01); *H04L 51/04* (2013.01); *H04L 51/32* (2013.01)

(58) Field of Classification Search
  CPC ............ G06F 16/24578; G06F 16/337; G06F 16/9535; G06F 21/6245; G06F 40/295; G06F 40/56; G06F 16/00; G06F 16/2246; G06F 16/2365; G06F 16/2393; G06F 16/245; G06F 16/24561; G06F 16/904; G06F 21/32; G06F 30/20; G06F 40/35; G06F 9/542; G06F 16/2358; G06F 3/0482; G06F 40/134; G06F 40/30; G06F 9/547; G06F 3/048; G06F 3/04817; G06F 8/60; G06F 8/61; G06F 9/45504
  See application file for complete search history.

(56) References Cited

U.S. PATENT DOCUMENTS

| | | | |
|---|---|---|---|
| 2009/0234876 A1* | 9/2009 | Schigel | H04L 51/02 |
| 2012/0226759 A1* | 9/2012 | Lew | H04L 51/38 |
| | | | 709/206 |
| 2013/0018948 A1* | 1/2013 | Douillet | G06F 9/541 |
| | | | 709/204 |
| 2013/0080538 A1* | 3/2013 | McEachern | H04L 51/32 |
| | | | 709/206 |

* cited by examiner

*Primary Examiner* — Rayeez R Chowdhury
(74) *Attorney, Agent, or Firm* — Sterne, Kessler, Goldstein & Fox P.L.L.C.

(57) ABSTRACT

Disclosed herein are method, system and device embodiments for responding to a customer via a dynamic multi-channel publisher. An embodiment operates by providing a window in a graphical user interface (GUI) that provides access to a list of channels related to a customer, receiving a selection of a first channel from the list of channels in response to a request from the customer using a second channel from the list of channels, and updating the window with one or more message types and one or more action types corresponding to the first channel to respond to the request. The list of channels corresponds to multiple applications available to communicate with the customer, and the first channel is different from the second channel.

20 Claims, 24 Drawing Sheets

DYNAMIC MULTI-CHANNEL PUBLISHER

BACKGROUND

Companies communicate with consumers of their products and services via multiple channels, for example, email, live chat, phone call, short message service (SMS), and social media including Facebook and Twitter. Service agents in these companies often support their customers via these channels. These service agents may simultaneously work on multiple channels to communicate with their customers. Conventionally, these channels are separate applications and the service agents need to respond to their customers in separate application windows. It is helpful to have tools to simplify the workflow across these multiple channels.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
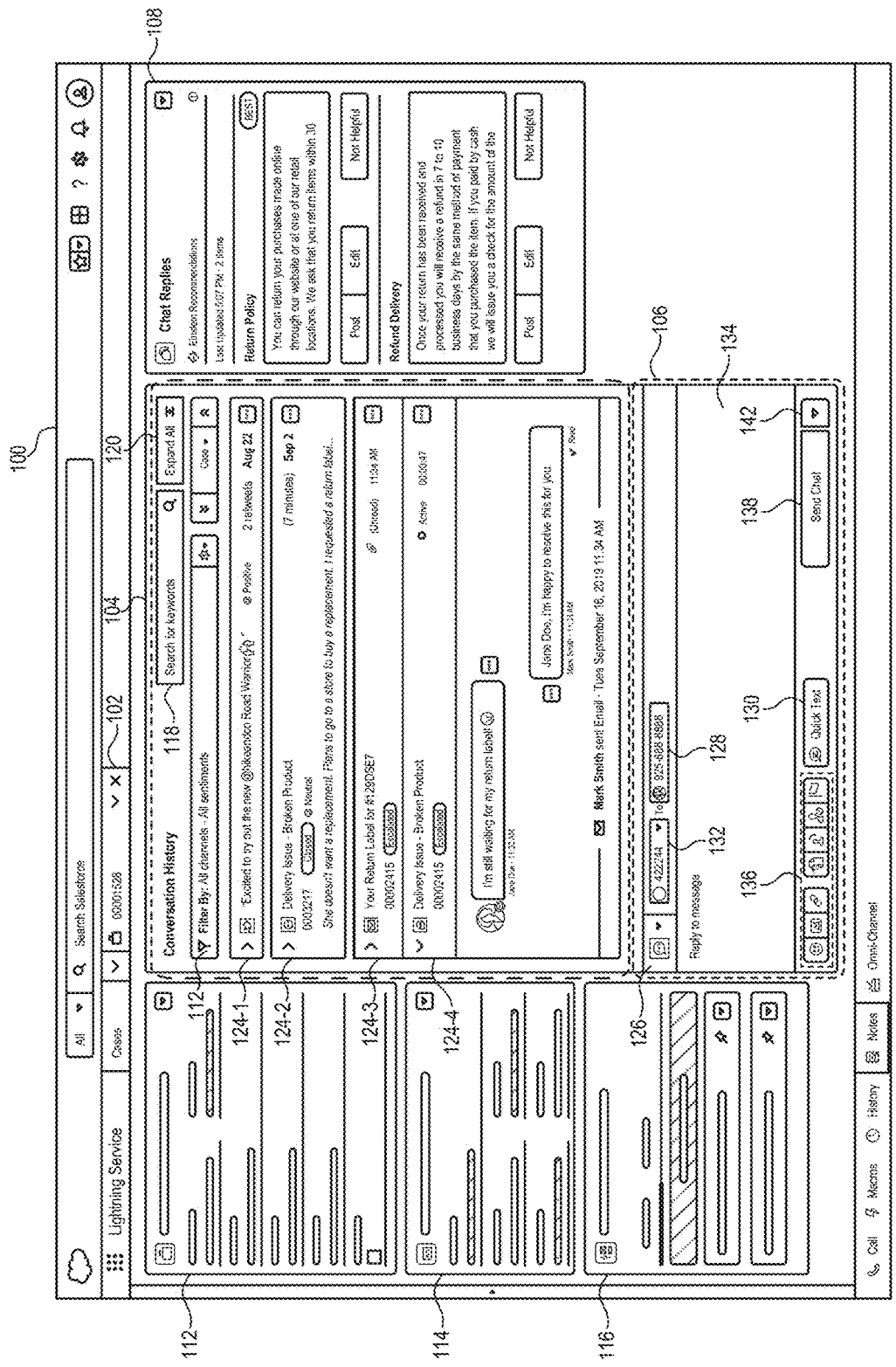
FIG. 1 illustrates a Graphical User Interface (GUI) screenshot of a lighting service home page with a dynamic publisher window, according to some embodiments.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Provided herein are method, system, and/or computer program product embodiments, and/or combinations and sub-combinations thereof, for dynamic multi-channel publisher user interface.

Service agents of a company communicate with customers of their products and services via multiple channels, for example, email, live chat, phone call, short message service (SMS), and social media including Facebook and Twitter. These channels may be obtained during company's prior interactions with these customers. Service agents in the company can support their customers via these available channels, either by simultaneously working on multiple channels, or by working on one channel regularly and following up with another channel. Conventionally, these channels are separate applications and service agents need to open new windows or tabs in order to respond to their customers' requests via a different channel. Switching between different channels not only disrupts the workflow of the service agents, but also takes service agent multiple extra clicks and thus adds extra time to the interaction.

Embodiments of the present disclosure, among other things, describe an apparatus, device, method and/or computer program product to respond to a customer via a dynamic multi-channel publisher. Using the dynamic publisher disclosed herein, service agents that currently are working on a channel can reply to their customers on a different channel by selecting the different channel from a list of available channels. For example, a customer calls his/her insurance company and asks for proof of insurance for a refinance. In the dynamic publisher window, a service agent of the insurance company on the call can switch channels from phone call to email while on the call and send the proof of insurance to the customer. This can provide the service agent a quicker response to the customer, comparing with opening a new window or new tab and email the proof of insurance conventionally.

Moreover, different channels in the dynamic publisher can provide different message types and action types. A message type can be a type of the message for the channel to respond to the customer. For example, a response via Facebook message can include message types of reply, comment, and direct message (DM), and a response via email can include message types of reply, reply all, forward, and comment. An action type can be a type of action associated with the message for the channel to respond to the customers. The action type can depend on both the channel and the message type. For example, a response via Facebook reply message can include action types of inserting emojis and pictures together with the reply message, and a response via email reply can include attaching documents and links together with the email.

Service agents can dynamically switch channels as well as their associated message types and action types in the dynamic publisher in response to a customer. For example, a customer writes a negative comment on Fuzzy Cat Care's Facebook page. A service agent of Fuzzy Cat Care can reply with a message type of Facebook comment, which allows action types of posting text and emojis on Facebook. The service agent can follow up with this customer by a different channel in the dynamic publisher, such as sending an email with a solution to the customer if the customer's email is in the list of channels of the dynamic publisher. The service agent can select message types for an email in the dynamic publisher, including reply, reply all, forward, etc. And the service agent can reply to the email in the dynamic publisher with action types including inserting links, templates, or attachments. The dynamic publisher can update the message types and action types after switching to a different channel.

FIG. 1 illustrates a Graphical User Interface (GUI) screenshot of a lighting service home page 100 with a dynamic publisher window 106, according to some embodiments. Lighting service home page 100 can provide various services to a case 102, for example Case 00001528 as shown in FIG. 1. Lighting service home page 100 can include a conversation history window 104, dynamic publisher window 106, a chat replies window 108, as well as additional windows 112, 114, and 116 that can provide related information for case 102.

In some embodiments, conversation history window 104 can include a search box 118, an expand all button 120, a filter box 122, and a list of conversation histories 124-1, 124-2, 124-3, and 124-4 related to a customer of case 102 via multi channels. A service agent can search through the conversation history by keywords using search box 118. Conversation histories 124-1, 124-2, 124-3, and 124-4 can be expanded by clicking on expand all button 120, and collapsed after clicking another time. The service agent can filter conversation histories by different channels and different sentiments such as positive, neutral or negative. Past conservation histories of 124-1, 124-2, and 124-3 can be collapsed as indicated by the right arrow at the front of each past conversation history. Current conservation history 124-4 can be expanded, as indicated by the down arrow at the front, to display the current conversation with the customer. Each conversation history can further include an icon representative of the channel, at least part of the conversation content, a sentiment indicator, a status indicator, as well as a date and a time of the conversation. The sentiment indicator can indicate a positive, neutral, or negative sentiment of corresponding conversation history.

In some embodiments, dynamic publisher window 106 can include a current channel 126, a customer account 128, a reply account 132, a message window 134, action types 136, a quick text button 130, a send button 138, and a down arrow 142. Current channel 126 can indicate the current channel used by the service agent to respond to the customer. For example, a bird icon can represent Twitter, an envelope icon can represent email, and an "f" icon can represent Facebook. Current channel 126 can further include a down arrow next to it, which can show a list of channels that are available to respond to the customer after clicking on it. Customer account 128 and reply account 132 can respectively include a photo and a phone number for a channel of SMS. In some embodiments, reply account 132 can include a list of managed accounts corresponding to current channel 126, such as a phone number, a Facebook account, a Twitter handle, a sales account, and a customer service account. In addition, reply account 132 can change to other managed accounts by clicking on the down arrow next to it and allow the service agent to change the managed account from which he or she replies. For example, the service agent can change reply account 132 from a sales account to a customer service account. Message window 134 can be a main part of dynamic publisher window 106. Message window 134 can include some placeholder messages, for example, "Reply to message" as shown in FIG. 1.

Referring to FIG. 1, action types 136 can included one or more actions corresponding to current channel 126 and selected message type. For example, as shown in FIG. 1, action types 136 can include inserting emojis, photos, and links, copying from another message, transferring, blocking, and flagging for current channel 126 of SMS and reply message type. A message type can be selected from a list of message types by clicking on down arrow 142. In some embodiments, action types can be updated according to the message type of current channel 126. For example, if a voice message function is added to SMS, action types 136 can be updated to include an action to send voice message. Quick text button 130 can provide the service agent convenience to send a quick text from a list of predefined messages, like greetings, answers to common questions, and short notes. After messages are inserted in message window 134, send button 138 can change from grayed out to active status. In some embodiments, messages in message window 134 can be sent to the customer after clicking on send button 138. In some embodiments, messages in message window 134 can be sent to the customer after pressing on an "Enter" key on a keyboard.

In some embodiments, chat replies window 108 can include recommended replies to quickly respond to the customer. For example, as shown in FIG. 1, in response to customer Jane Doe's request of return label, recommended replies can include replies of return policy and refund delivery. The service agent can directly post the recommended replies to message window 134 and send to customer by clicking send button 138. The service agent can also edit the recommended replies and post them if need. If the recommended replies are not related at all, the service agent can click on a button of "Not Helpful" for improvement of recommendation.

Figure 2:
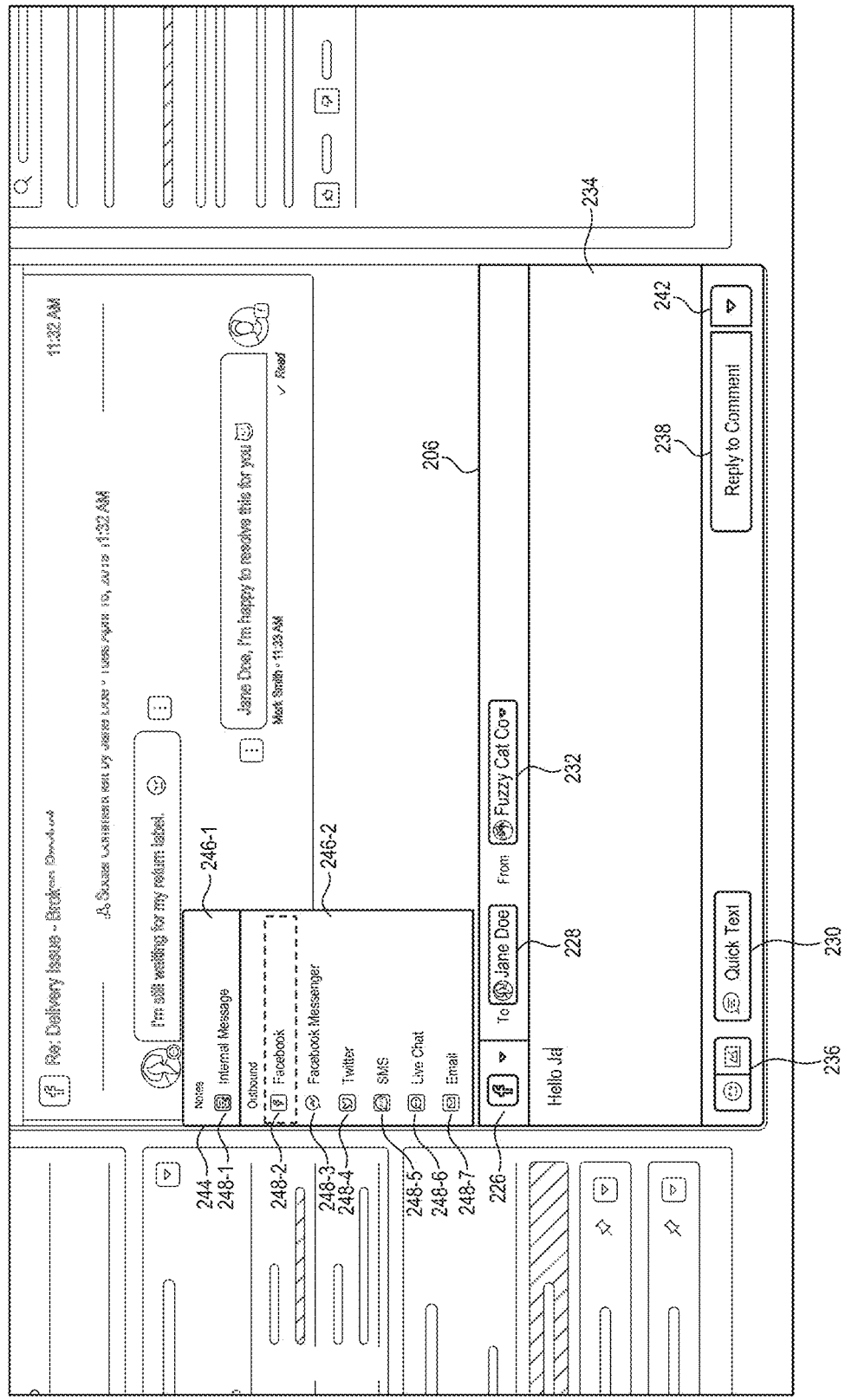
FIG. 2 illustrates a screenshot of a dynamic publisher window with a channel list, according to some embodiments.

FIG. 2 illustrates a screenshot of a dynamic publisher window 206 with a channel list 244, according to some embodiments. As shown in FIG. 2, dynamic publisher window 206 can switch current channel 226 to Facebook. Corresponding message types and action types 236 can be updated according to current channel 226. After clicking on the down arrow next to current channel 226, a channel list 244 can be displayed over the conversation history window. Channel list 244 can include a notes section 246-1 and an outbound section 246-2. Notes section 246-1 can include internal message 248-1, and outbound section 246-2 can include outbound channels of Facebook 248-2, Facebook Messenger 248-3, Twitter 248-4, SMS 248-5, live chat 248-6, and email 248-7. In some embodiments, available channels in channel list 244 can be updated if more channels to respond to the customer are added. While communicating with the customer with one channel in dynamic publisher window 206, such as current channel 126 of SMS in FIG. 1, the service agent can switch to a different channel in channel list 244 by clicking on the desired channel, such as current channel 226 of Facebook in FIG. 2. Dynamic publisher window 206 can include multiple available channels to respond to the customer in channel list 244, thus providing convenience to the service agent when switching channels. Dynamic publisher window 206 can improve response time of the service agent and also improve customer experience.

According to some embodiments, message types and action types can be updated after switching channels in dynamic publisher window 206. As shown in FIG. 2, action types 236 can be updated to inserting emojis and photos for Facebook reply to comment message type. Multiple message types, such as reply, comment and direct message, can be selected after clicking on down arrow 242, for example, reply to comment as shown in FIG. 2. Correspondingly, send button 238 can change to reply to comment to indicate the selected message type. Additionally, customer account 228 and reply account 232 can include a photo and an account name corresponding to current channel 226 of Facebook, respectively. After the service agent starts typing in message window 234, send button 238 can change from grayed out status to active status, and the typed message in message window 234 as well as any actions performed from action types 236 can be sent via current channel 226, for example, replied to the customer's comment on Facebook as shown in FIG. 2.

FIGS. 3A-3H illustrate screenshots of dynamic publisher windows 306A-306H for current channels 326A-326H, according to some embodiments. As shown in FIGS. 3A-3H, action types 336A-336H and message types indicated in send buttons 338A-338H can be updated corresponding to current channels 326A-326H. For current channel 326D of internal notes, dynamic publisher window 306D can include a notice 332D to indicate that the message is for internal notes. Message window 334D can be highlighted with a different color to notify the service agent. The placeholder text can include "Leave an internal message for your team. Feel free to @Mention anyone!" Internal notes can be used by the service agent to acquire information for the customer that the service agent may not have from internal teams during the communication with the customer. This can reduce the response time of the service agent to look for the information, enable the service agent to respond to customer request with needed information during the communication and significantly improve customer satisfaction.

Figure 3A:
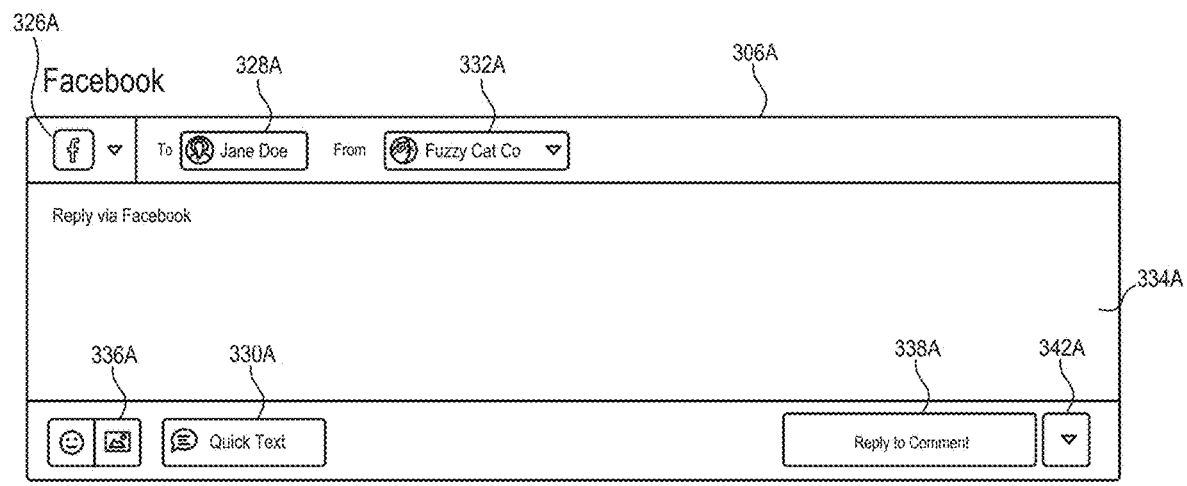
FIGS. 3A-3H illustrate screenshots of dynamic publisher windows for various channels, according to some embodiments.
Figure 3B:
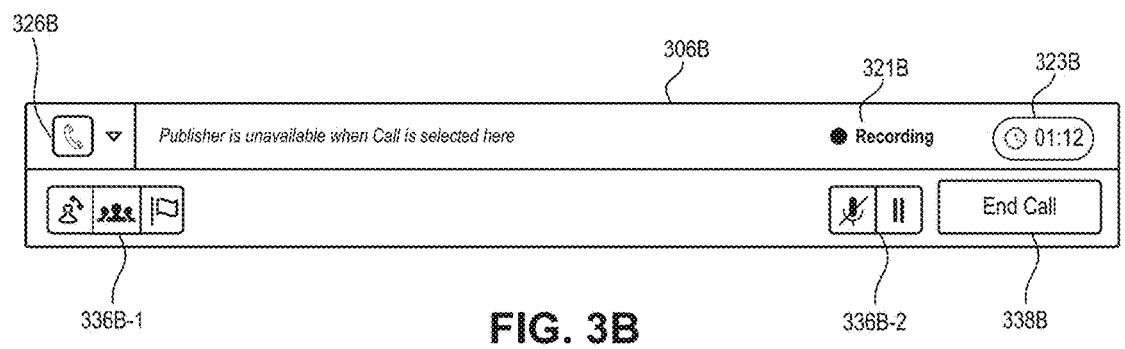
Figure 3C:
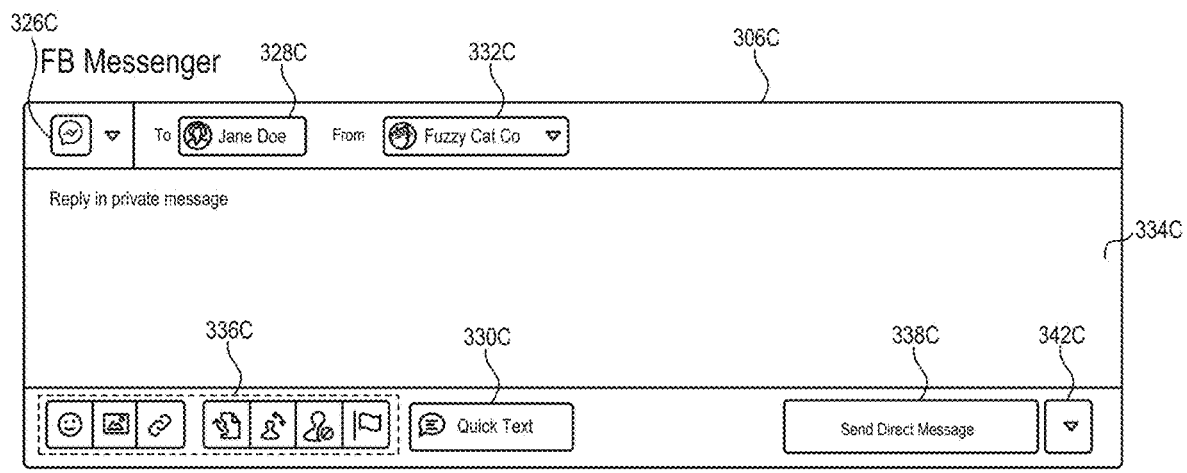

Each of dynamic publisher windows 306A-306H can include additional features that correspond to current channels 326A-326H. For example, as shown in FIG. 3B, current channel 326B of phone call can include a recording button 321B to start and indicate recording of a current phone call, a timer 323B to display the time length of the phone call, additional action types 336B-2 in dynamic publisher window 306B. Action types 336B-2 can include additional actions like mute and hold during the current phone call.

Figure 3D:
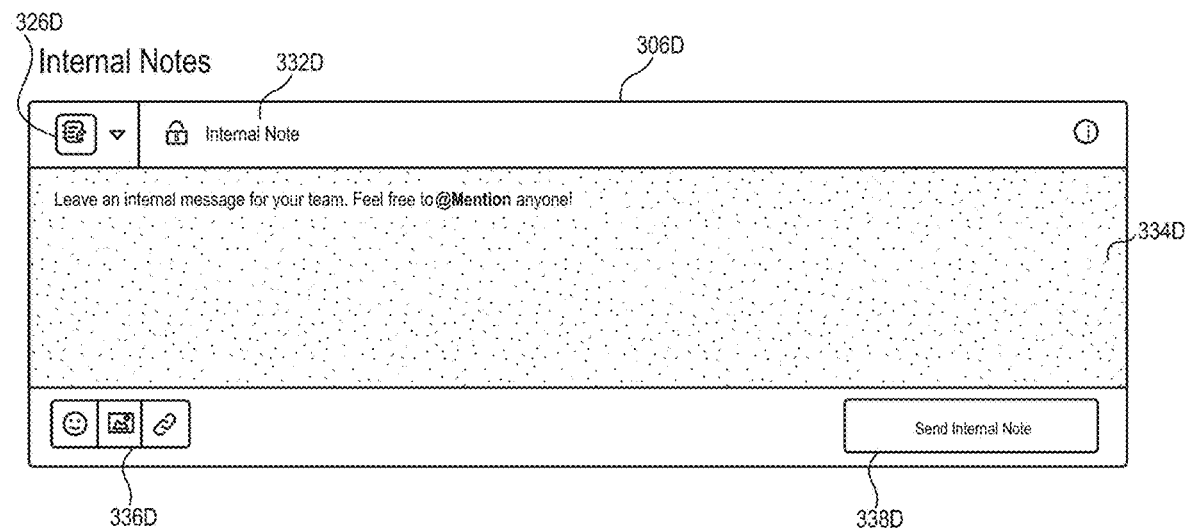
Figure 3E:
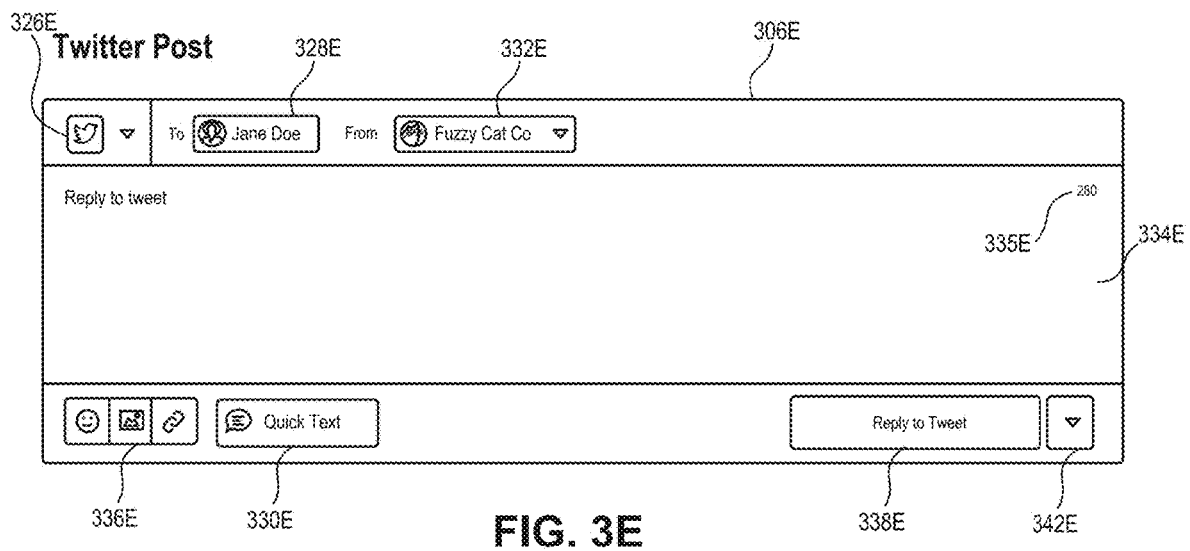
Figure 3F:
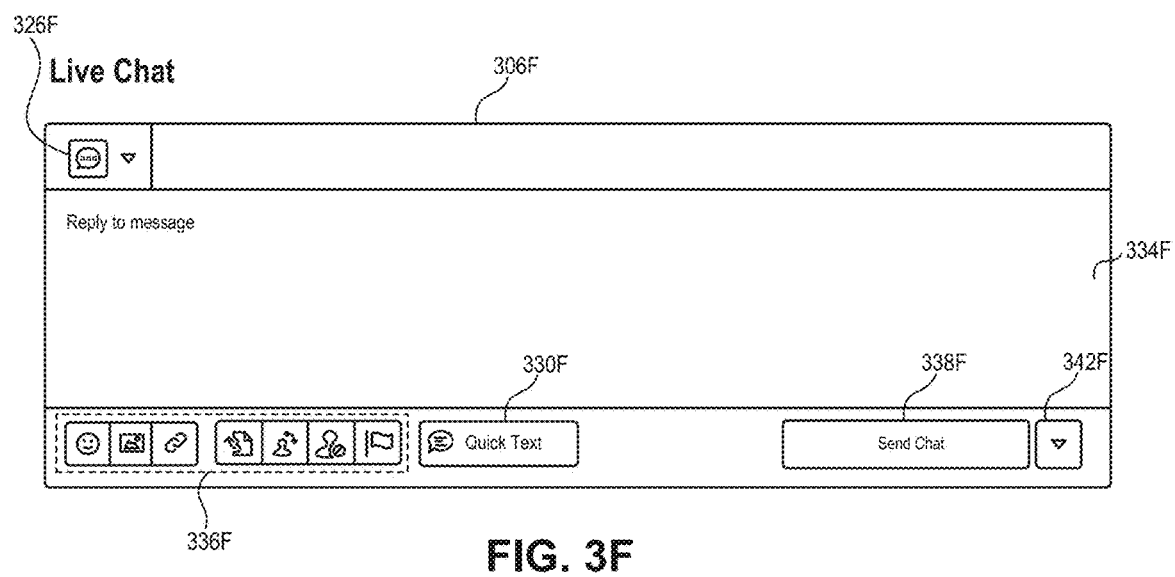
Figure 3G:
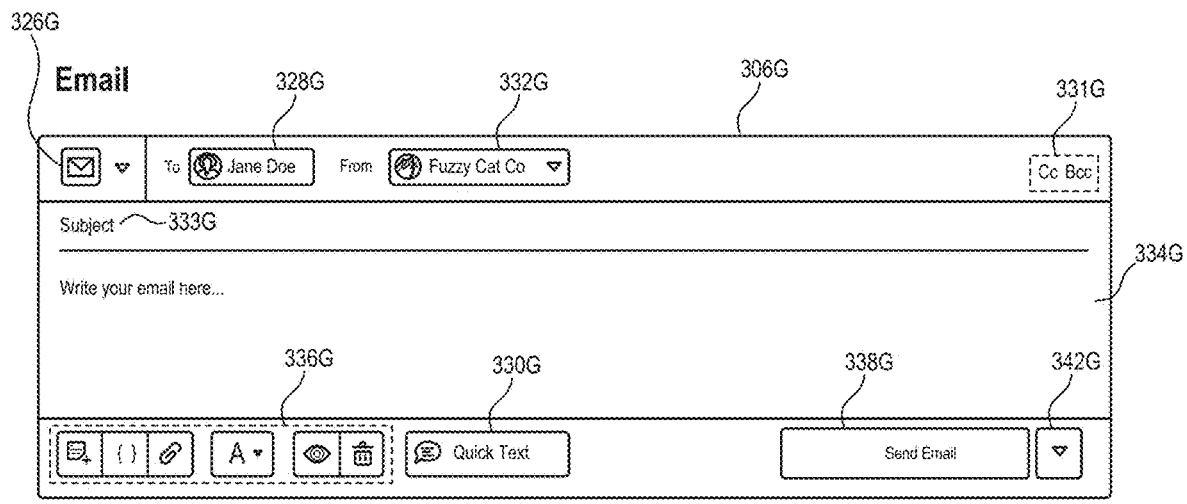

In another example, as shown in FIG. 3E, for current channel 326E of Twitter post, message window 334E can include a character counter 335E, which corresponds to the character counter in the application of Twitter post. And action types 336E can include a link, the third icon in action types 336E, for the service agent to initiate direct message. In a further example shown in FIG. 3G, current channel 326G of email can include a subject line 333G for the email subject, and copy buttons 331G to send carbon copies of current message to other email addresses.

In another example, as shown in FIGS. 3A, 3C, 3E, 3G, and 3H, customer accounts 328A, 328C, 328E, 328G, and 328H can display the customer account that the service agent is replying to. Reply accounts 332A, 332C, 332E, 332G, and 332H can display the reply account that the service agent is replying from.

Figure 4:
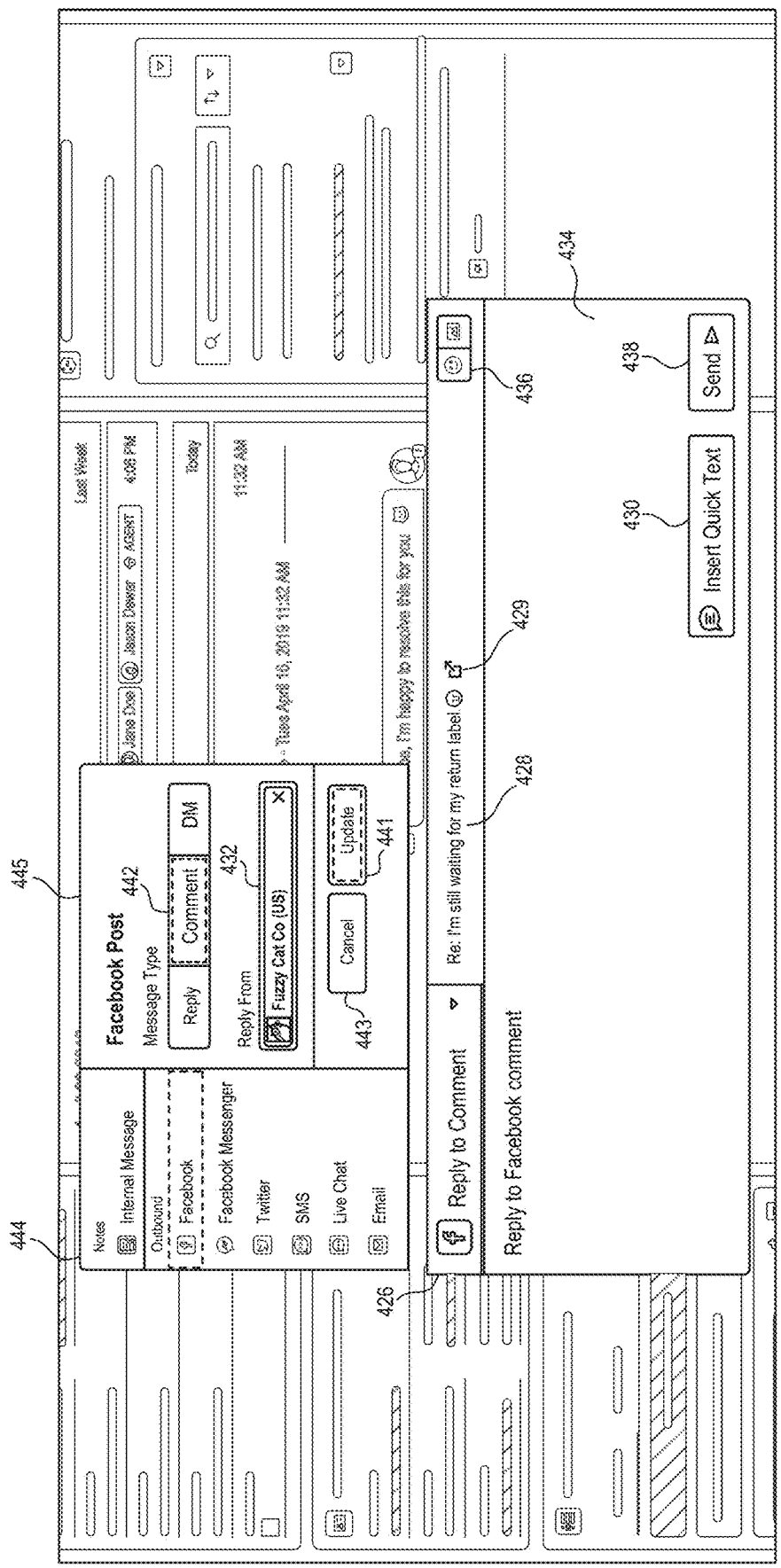
FIG. 4 illustrates a screenshot of a dynamic publisher window with a first message type configuration, according to some embodiments.

FIG. 4 illustrates a screenshot of a dynamic publisher window 406 with a first message type configuration, according to some embodiments. As shown in FIG. 4, in channel list 444 of current channel 426, each channel can have a selected channel window 445 next to channel list 444 including message type toggle button 442 and reply account 432. In some embodiments, the service agent can toggle between different message types for current channel 426 by clicking on message type toggle button 442. Current message type can be highlighted in message type toggle button 442. For example, message type "Comment" is highlighted to indicate the service agent can send comment type message to post on Facebook. The current message type highlighted in message type toggle button 442 can also be indicated on current channel 426, for example, "Reply to Comment" on current channel 426. After the service agent select the channel and message type to respond to the customer, the service agent can click on an update button 441 in selected channel window 445 to update current channel 426.

Referring to FIG. 4, Dynamic publisher window 406 can further include a recent message box 428 and a source link 429. While responding to the customer, the service agent can refer to the recent message in recent message box 428, and even view the source of the recent message by clicking on source link 429. In the first message type configuration, action types 436 can be located at the upper right corner of dynamic publisher window 406.

Figure 5A:
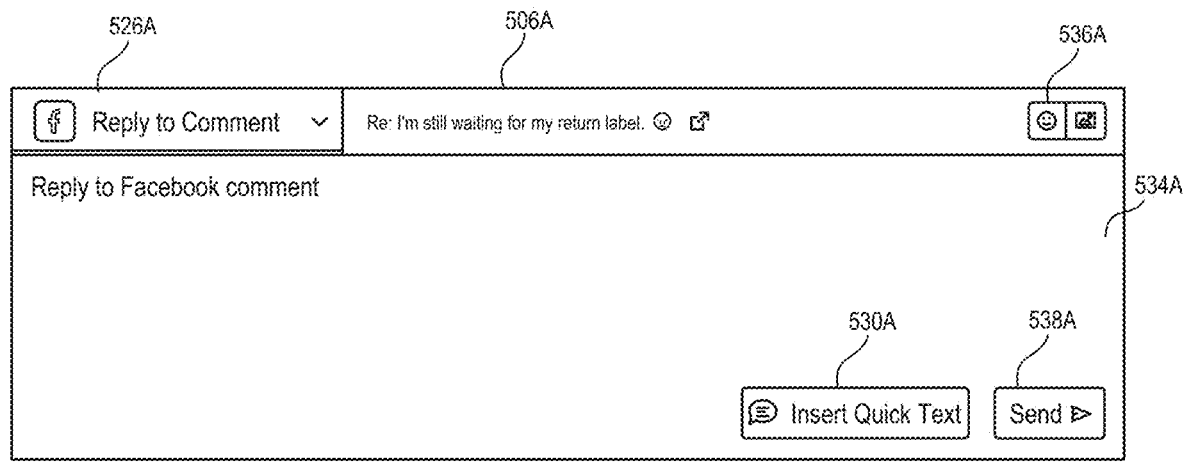
FIGS. 5A-5F illustrate screenshots of dynamic publisher windows with the first message type configuration for various channels, according to some embodiments.
Figure 5B:
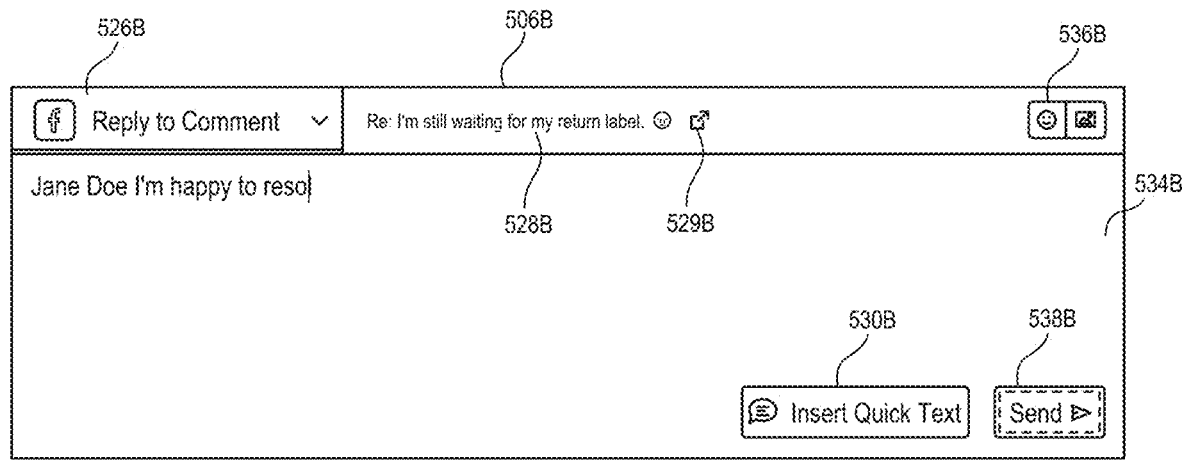
Figure 5C:
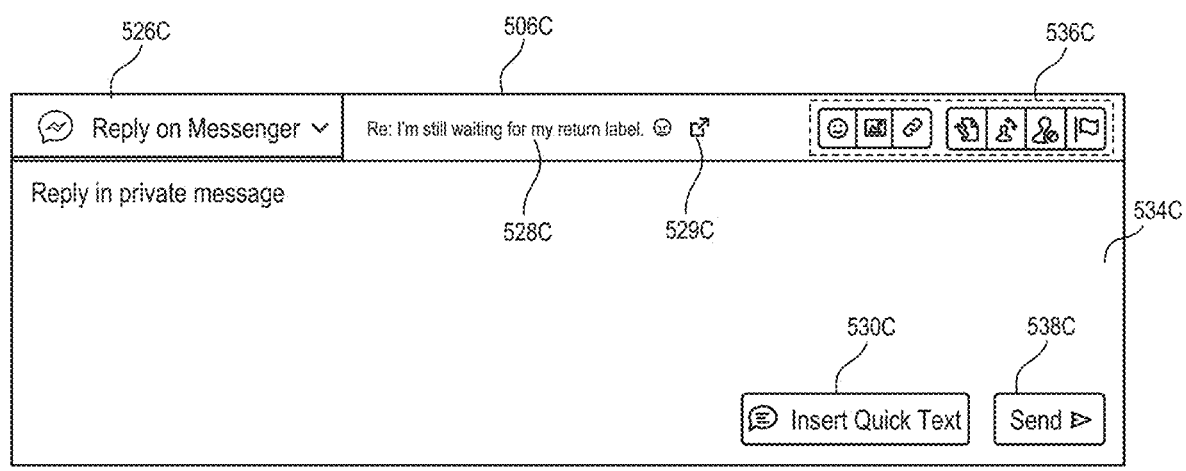
Figure 5D:
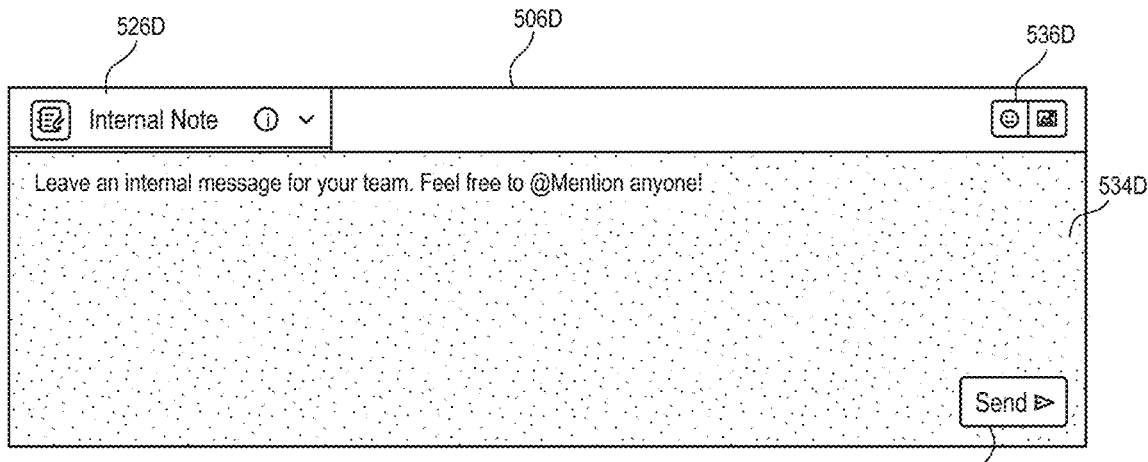
Figure 5E:
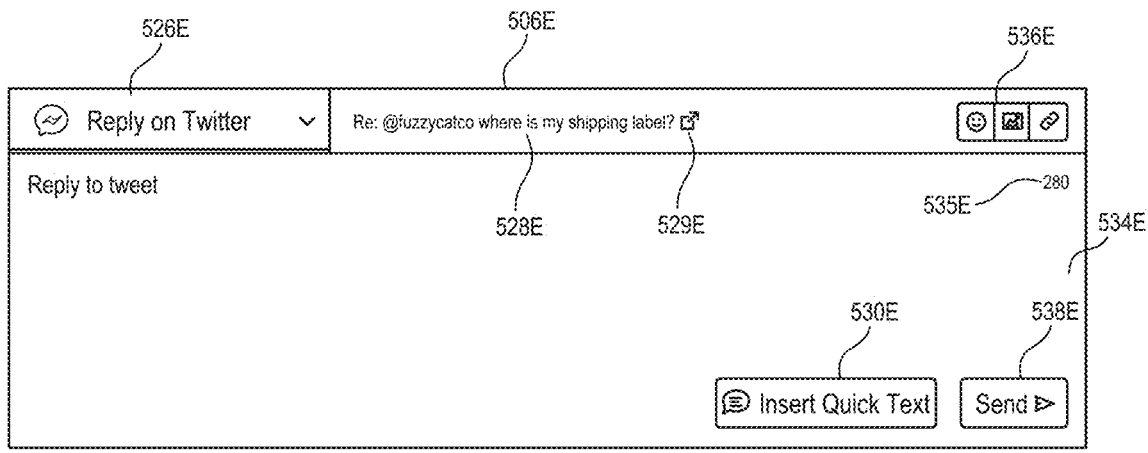
Figure 5F:
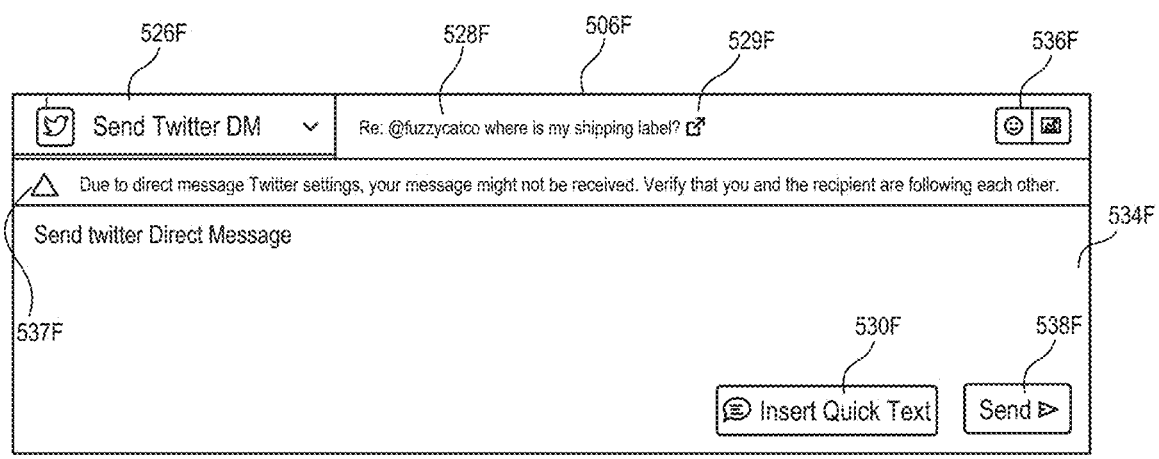

FIGS. 5A-5F illustrate screenshots of dynamic publisher windows 506A-506F with the first message type configuration for current channels 526A-526F, according to some embodiments. In the first message type configuration, recent message boxes 528A-528F and source links 529A-529F can be added to dynamic publisher windows 506A-506F, except dynamic publisher window 506D for current channel 526D of internal note. According to some embodiments, similar as FIGS. 3A-3H, Each of dynamic publisher windows 506A-506F can include additional features that correspond to current channels 526A-526F. For example, as shown in FIG. 5E, for current channel 526E of reply on Twitter, message window 534E can include a character counter 535E, and action types 536E can include a link for the service agent to initiate direct message. In another example of FIG. 5F, message for current channel 526F of send Twitter DM can only be sent to Twitter users who follow each other. Accordingly, message window 534F for dynamic publisher window 506F can include a warning message 537F. For example, warning message 537F in FIG. 5F can notify the service agent that "Duo to direct message Twitter settings, your message might not be received. Verify that you and the recipient are following each other."

Figure 6:
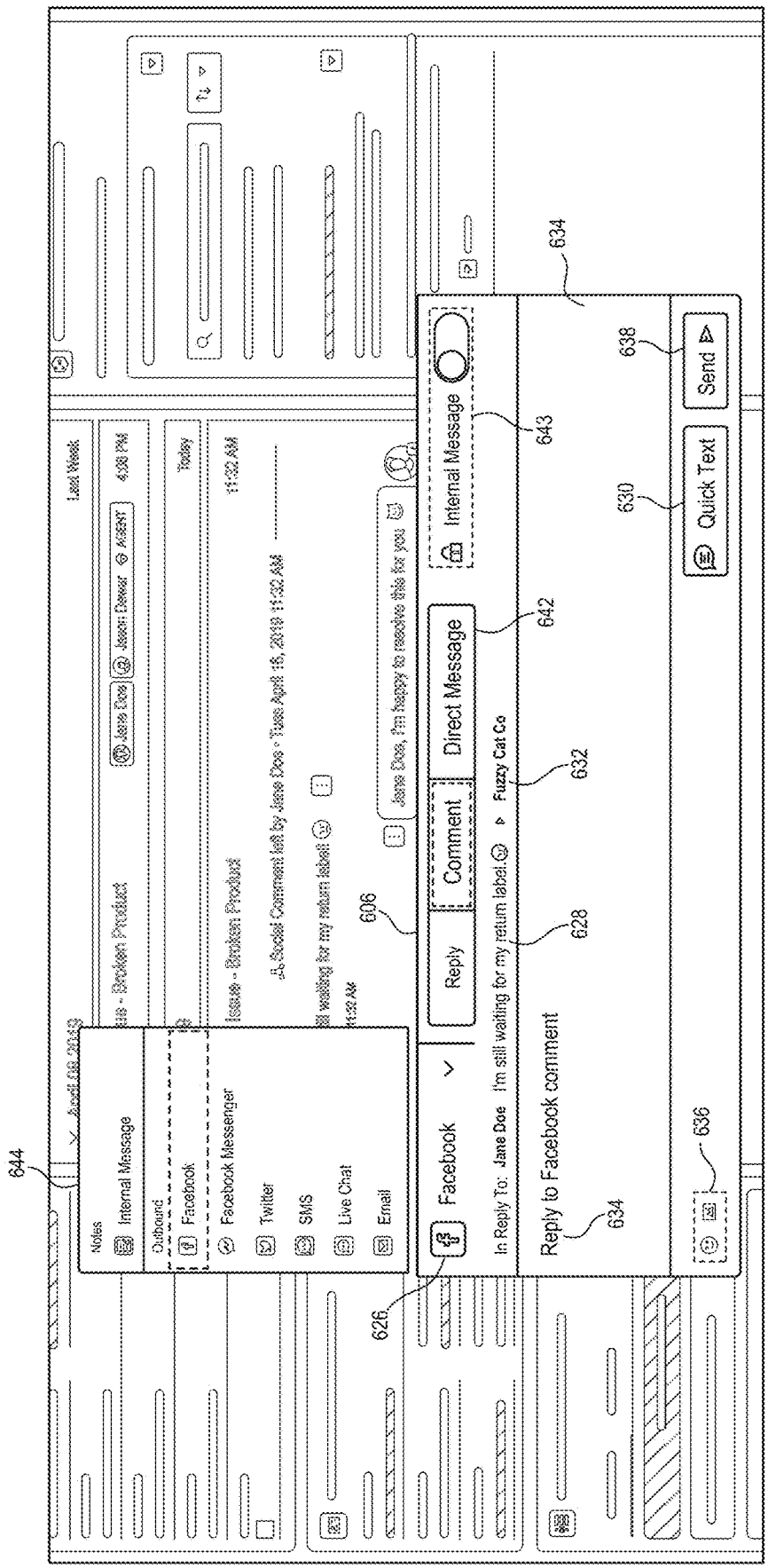
FIG. 6 illustrates a screenshot of a dynamic publisher window with a second message type configuration, according to some embodiments.

FIG. 6 illustrates a screenshot of a dynamic publisher window 606 with a second message type configuration, according to some embodiments. As shown in FIG. 6, dynamic publisher window 606 can include a message type toggle button 642 and an internal message toggle button 643 at the top of dynamic publisher window 606. In some embodiments, the service agent can toggle between different message types for current channel 626 by clicking on message type toggle button 442, similar as message type toggle button 642. Additionally, the service agent can toggle between current channel 626 and internal messenger by clicking on internal message toggle button 643. As a result, the service agent can click on internal message toggle button 643 during the communication with the customer to switch current channel 626 to internal note and get the information needed for the customer from internal team. Subsequently, the service agent can switch current channel 626 back from internal message to previous or another channel to respond to the customer. Recent message box 628 in dynamic publisher window 606 can further include a customer name in front of the recent message for the service agent.

FIGS. 7A-7F illustrate screenshots of dynamic publisher windows 706A-706F with the second message type configuration for current channels 726A-726F, according to some embodiments. In the second message type configuration, recent message boxes 728A-728F, message type toggle buttons 742A-742F, and internal message toggle buttons 743A-743F can be added to dynamic publisher windows 706A-706F, except dynamic publisher window 706D for current channel 726D of internal note. After clicking on internal message toggle button 743A-743C or 743E-743F, dynamic publisher windows 706A-706C or 706E-706F can switch to dynamic publisher window 706D for internal note. And internal message toggle button 743 D can be highlighted.

Figure 7A:
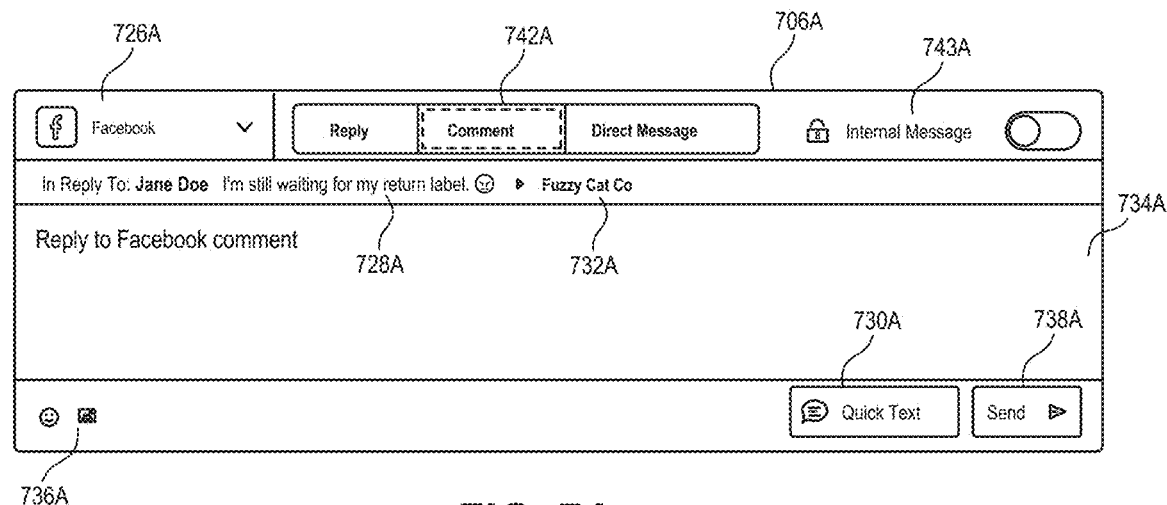
FIGS. 7A-7F illustrate screenshots of dynamic publisher windows with the second message type configuration for various channels, according to some embodiments.
Figure 7B:
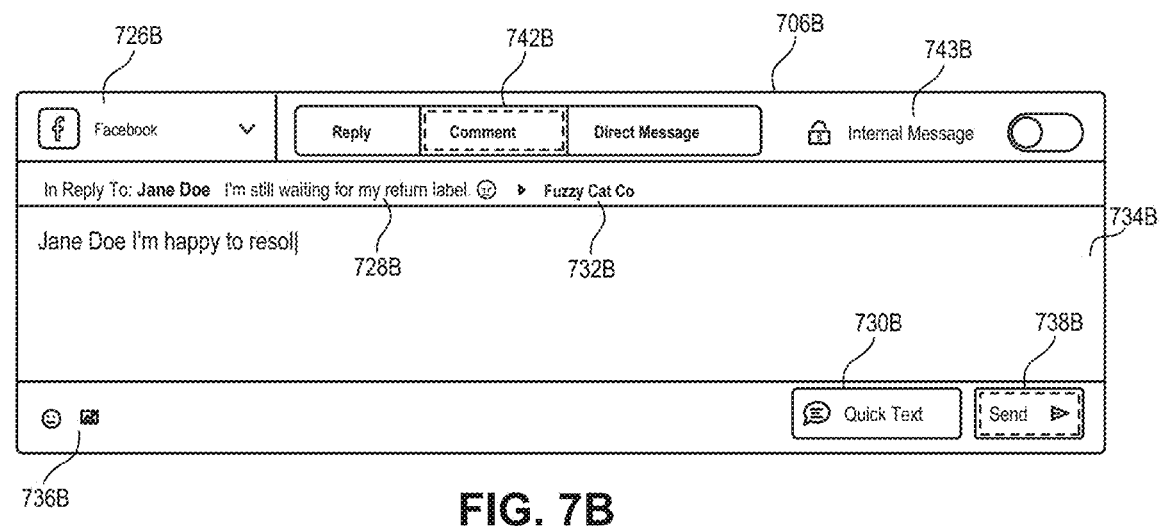
Figure 7C:
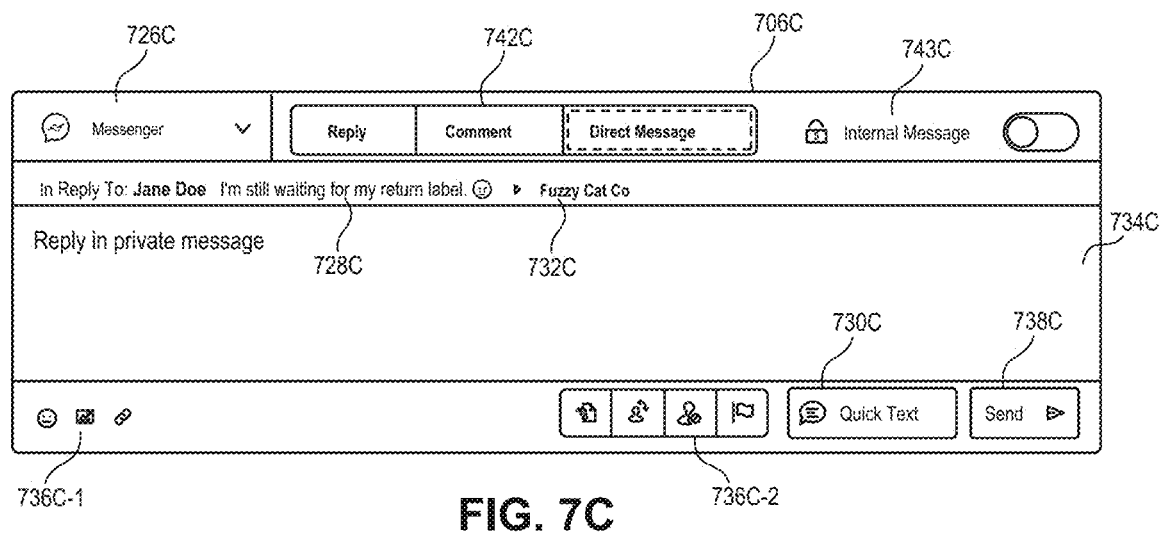
Figure 7D:
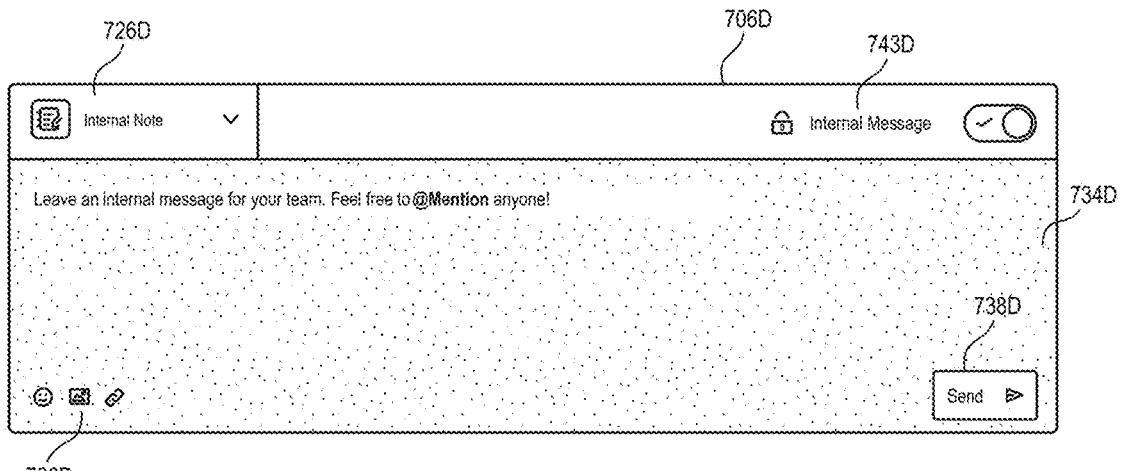
Figure 7E:
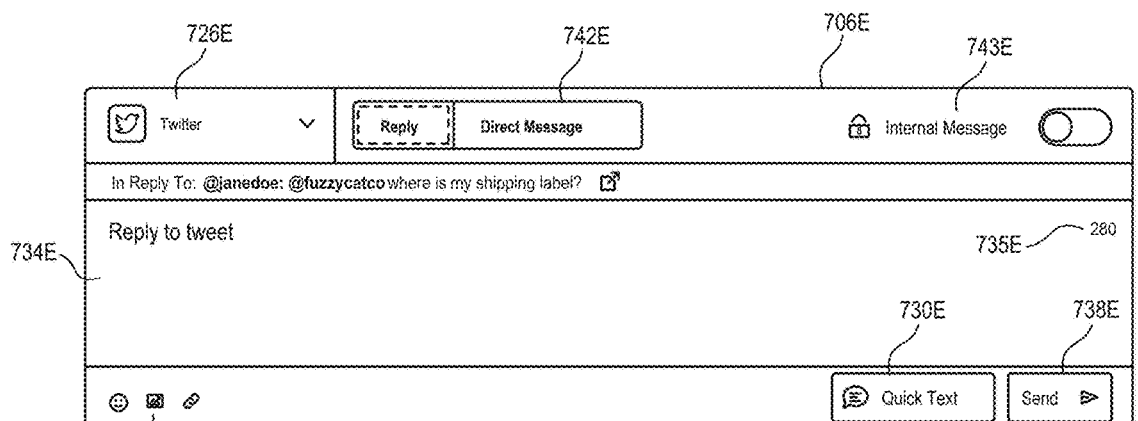
Figure 7F:
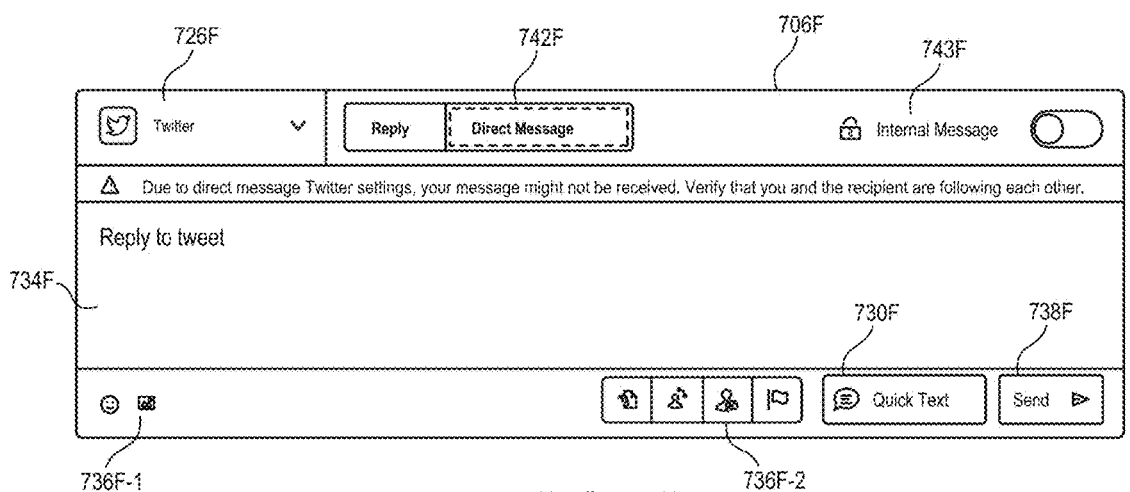

According to some embodiments, each of dynamic publisher windows 706A-706F can include additional features that correspond to current channels 726A-726F, similar as FIGS. 5A-5F. For example, as shown in FIG. 7E, for current channel 726E of Twitter with reply highlighted on message type toggle button 742E, message window 734E can include a character counter 735E, and action types 736E can include a link for the service agent to initiate direct message. In another example of FIG. 7F, message for current channel 726F of Twitter with direct message highlighted on message type toggle button 742F can only be sent to Twitter users who follow each other. Similarly, message window 734F for dynamic publisher window 706F can include a warning message 737F.

Figure 8:
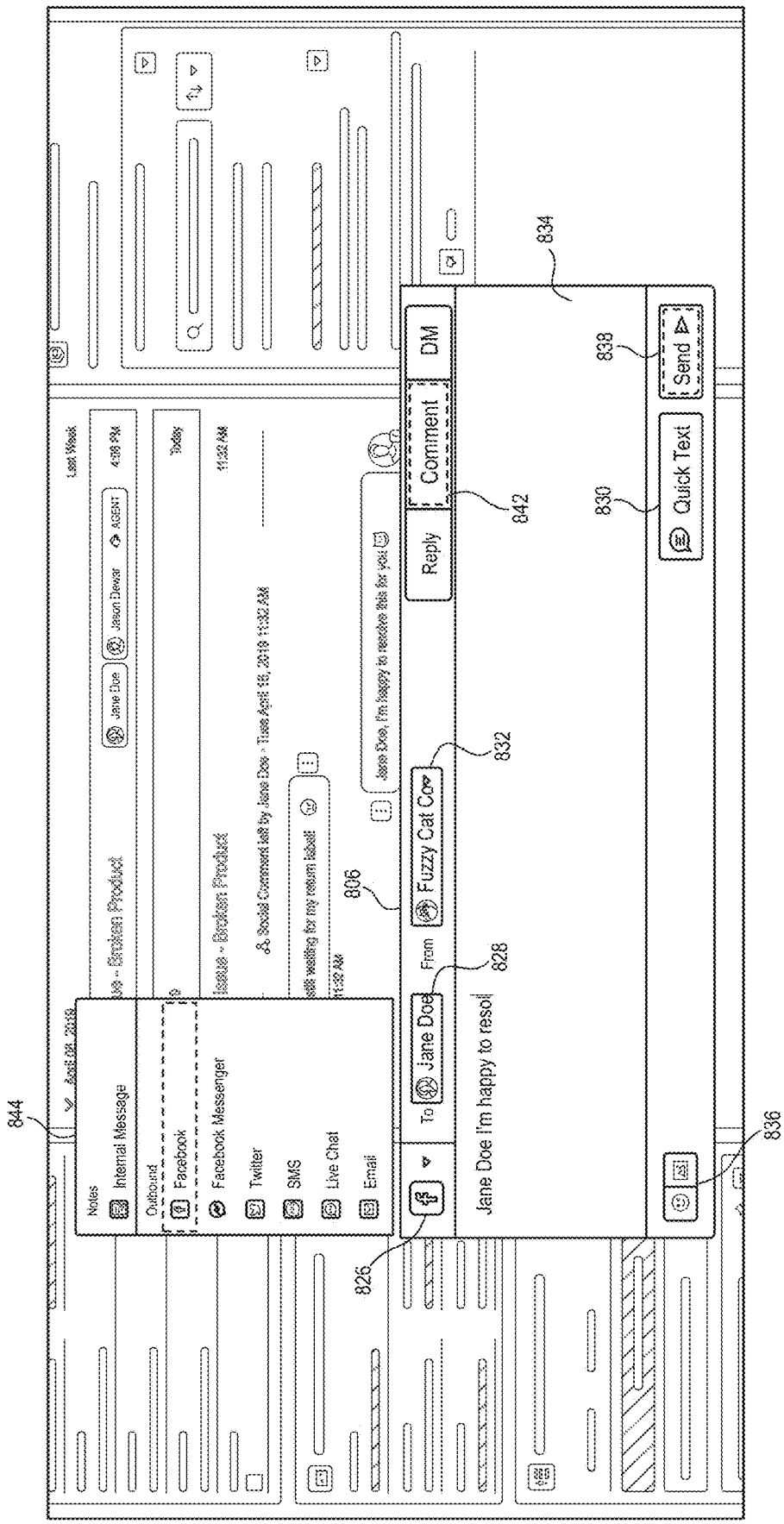
FIG. 8 illustrates a screenshot of a dynamic publisher window with a third message type configuration, according to some embodiments.

FIG. 8 illustrates a screenshot of a dynamic publisher window 806 with a third message type configuration, according to some embodiments. As shown in FIG. 8, dynamic publisher window 806 can include a message type toggle button 842 at the top left corner of dynamic publisher window 806. In some embodiments, the service agent can toggle between different message types for current channel 826 by clicking on message type toggle button 842, similar as message type toggle button 642. Customer account 828 and reply account 832 can respectively include a photo and an account name for current channel 826.

Figure 9A:
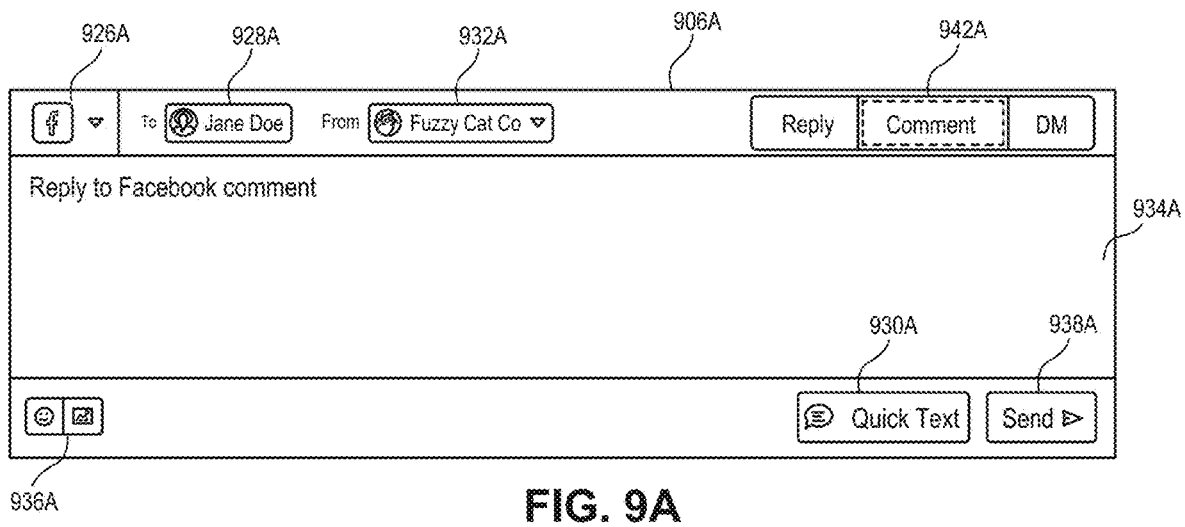
FIGS. 9A-9F illustrate screenshots of dynamic publisher windows with the third message type configuration for various channels, according to some embodiments.
Figure 9B:
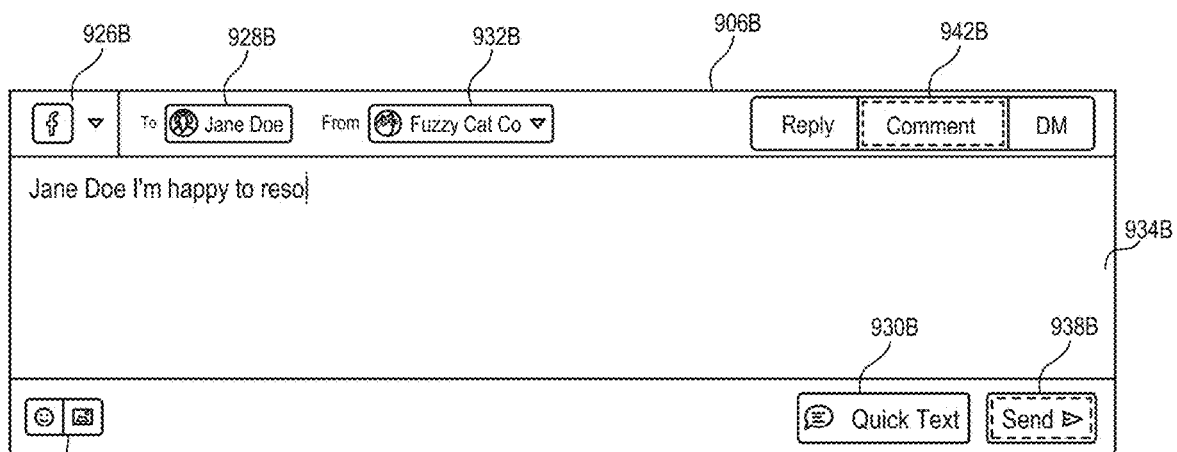
Figure 9C:
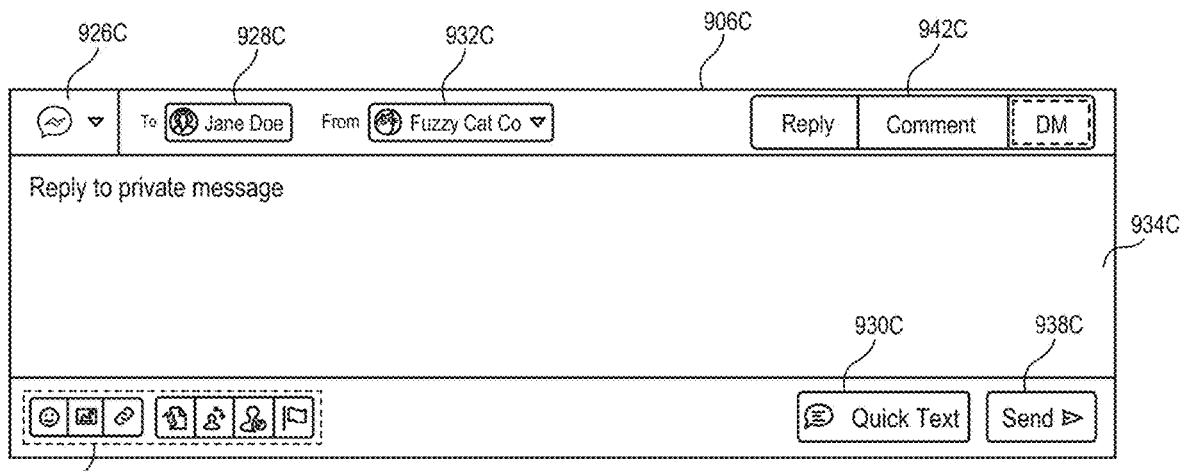
Figure 9D:
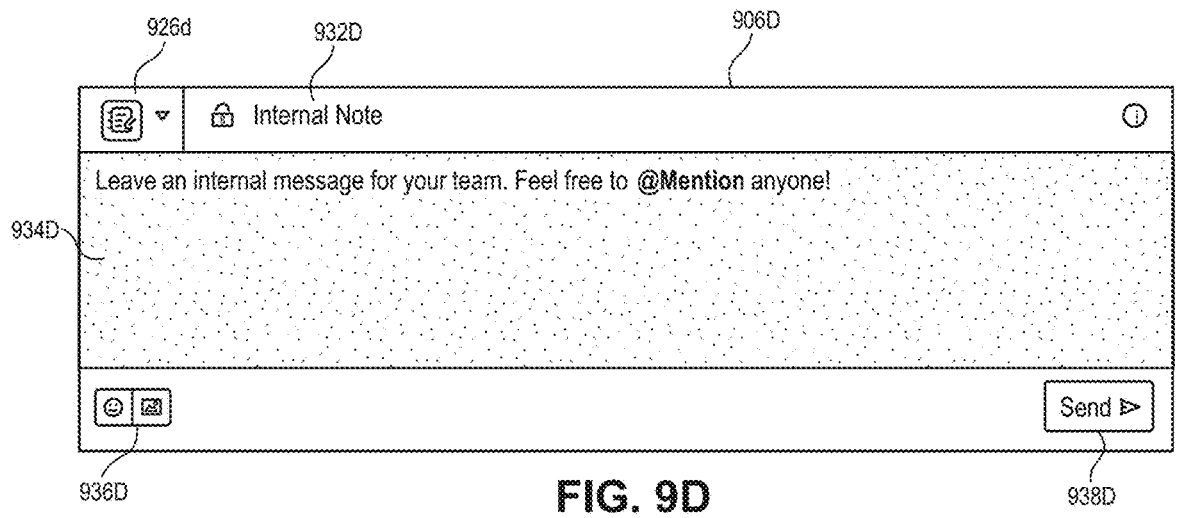
Figure 9E:
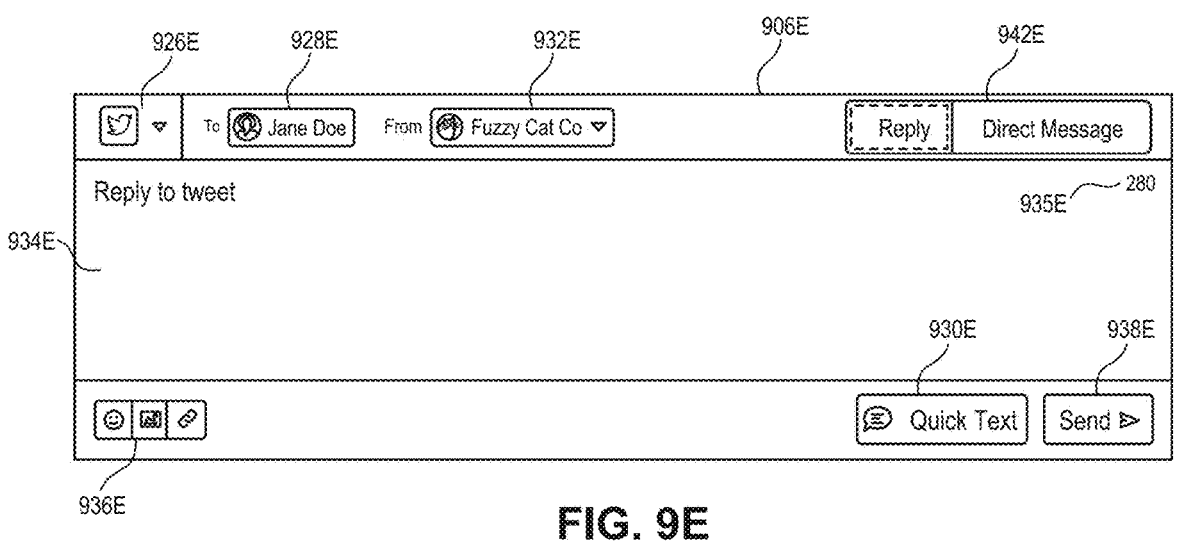
Figure 9F:
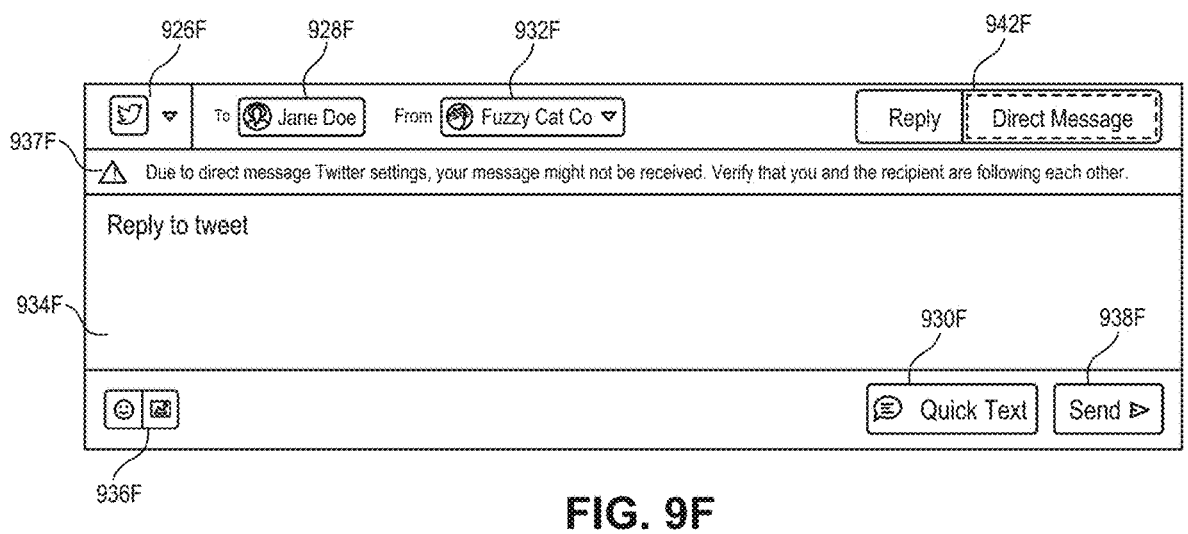

FIGS. 9A-9F illustrate screenshots of dynamic publisher windows 906A-906F with the third message type configuration for current channels 926A-926F, according to some embodiments. In some embodiments, each of dynamic publisher windows 906A-906F can include additional features that correspond to current channels 926A-926F, similar as FIGS. 5A-5F. For example, as shown in FIG. 9E, for current channel 926E of Twitter with reply highlighted on message type toggle button 942E, message window 934E can include a character counter 935E, and action types 936E can include a link for the service agent to initiate direct message. In another example of FIG. 9F, message for current channel 926F of Twitter with direct message highlighted on message type toggle button 942F can only be sent to Twitter users who follow each other. Similarly, message window 934F for dynamic publisher window 906F can include a warning message 937F.

Figure 10:
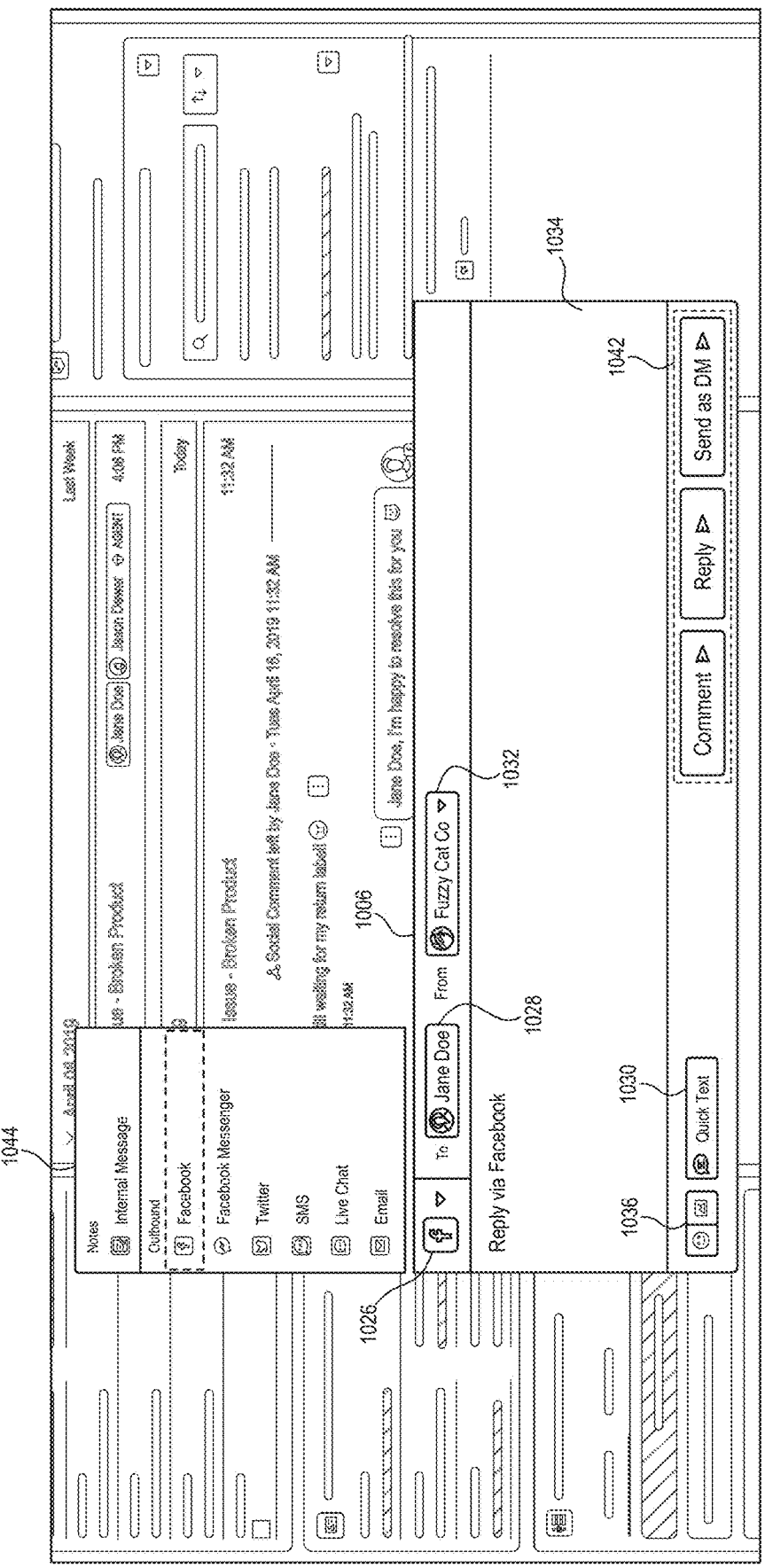
FIG. 10 illustrates a screenshot of a dynamic publisher window with a fourth message type configuration, according to some embodiments.

FIG. 10 illustrates a screenshot of a dynamic publisher window 1006 with a third message type configuration, according to some embodiments. As shown in FIG. 10, dynamic publisher window 1006 can include multiple send buttons 1042 for different message types at the bottom right corner of dynamic publisher window 1006. In some embodiments, the service agent can click on the corresponding button of send buttons 1042 to send the message in a desired message type. Send buttons 1042 can update for different current channel 1026. For example, as shown in FIG. 10, for current channel 1026 of Facebook, the service agent can send the message in message window 1034 as a comment by comment send button, as a reply by reply send button, or as a direct message by send as DM button.

Figure 11A:
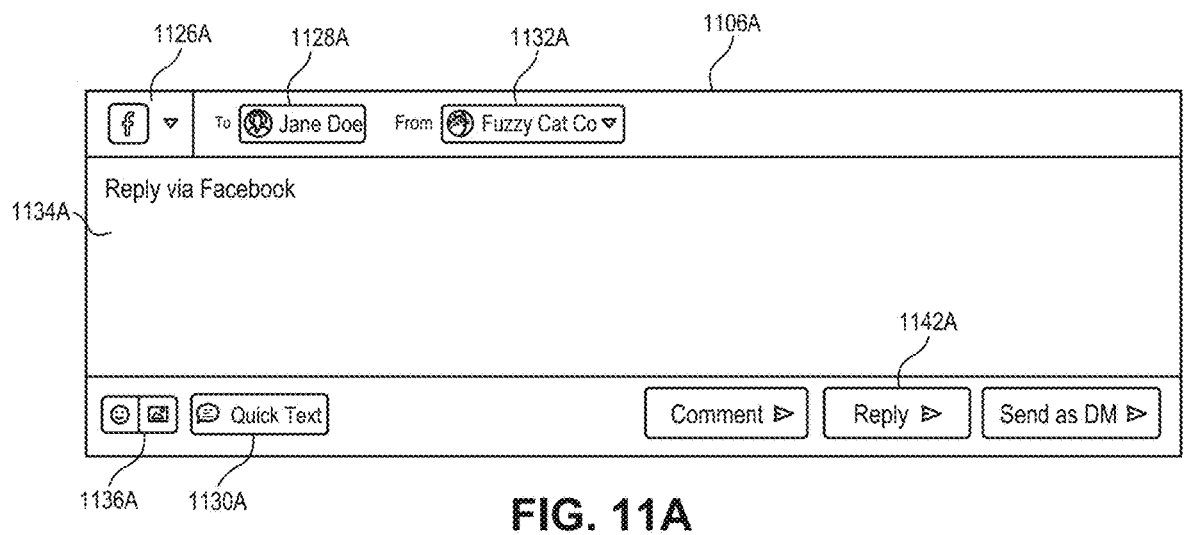
FIGS. 11A-11F illustrate screenshots of dynamic publisher windows with the fourth message type configuration for various channels, according to some embodiments.
Figure 11B:
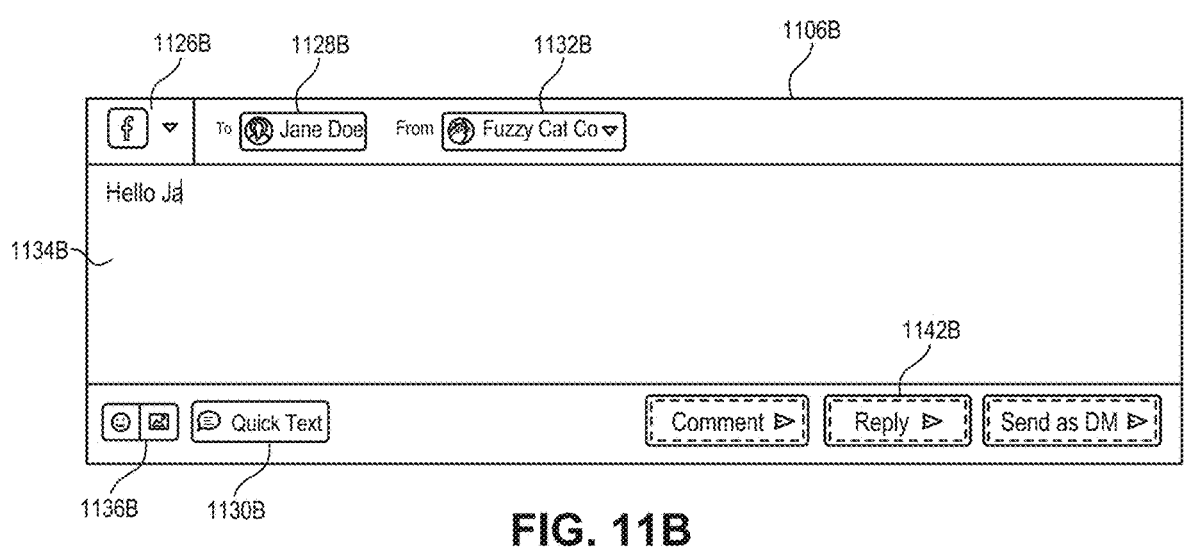
Figure 11C:
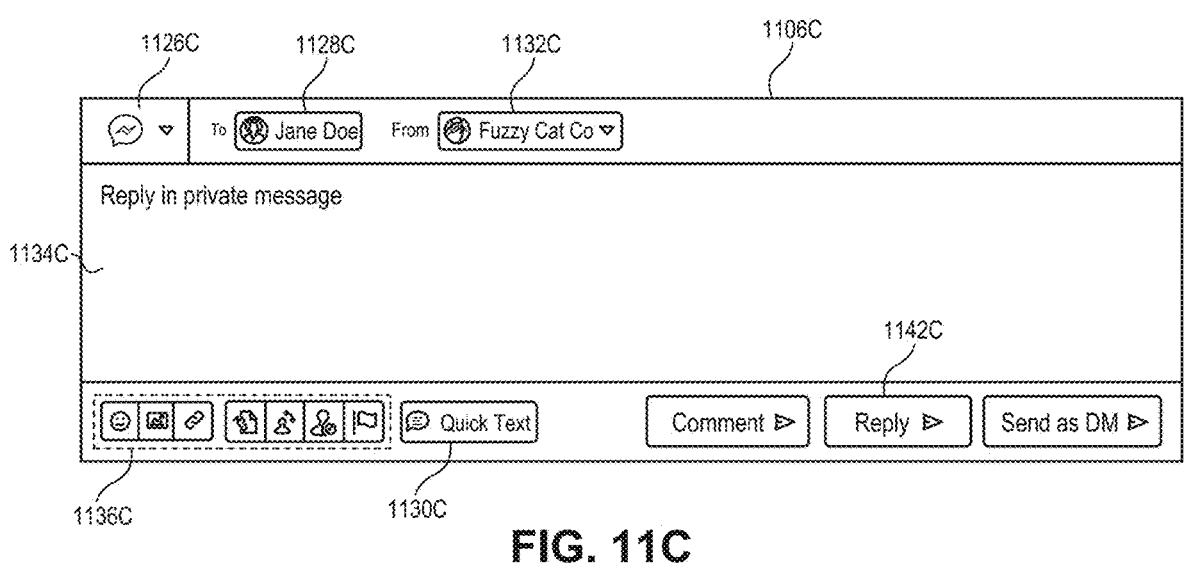
Figure 11D:
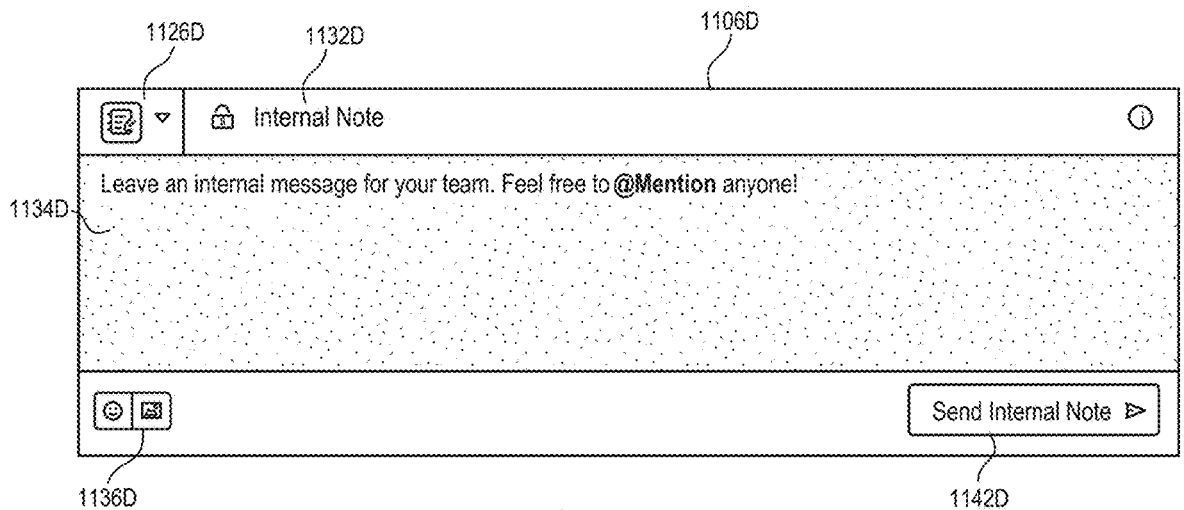
Figure 11E:
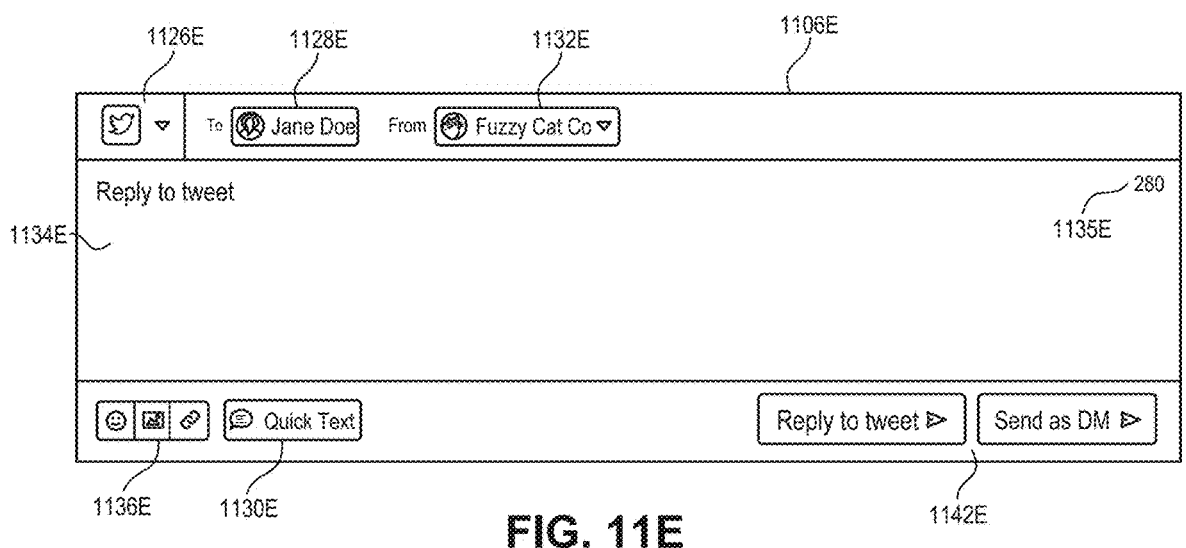
Figure 11F:
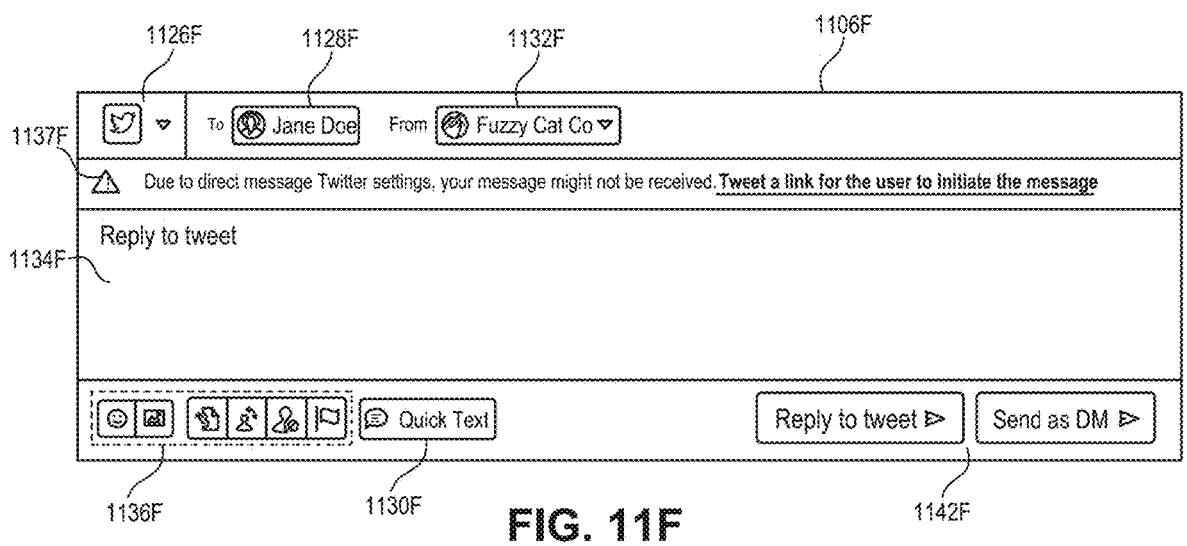
Figure 12A:
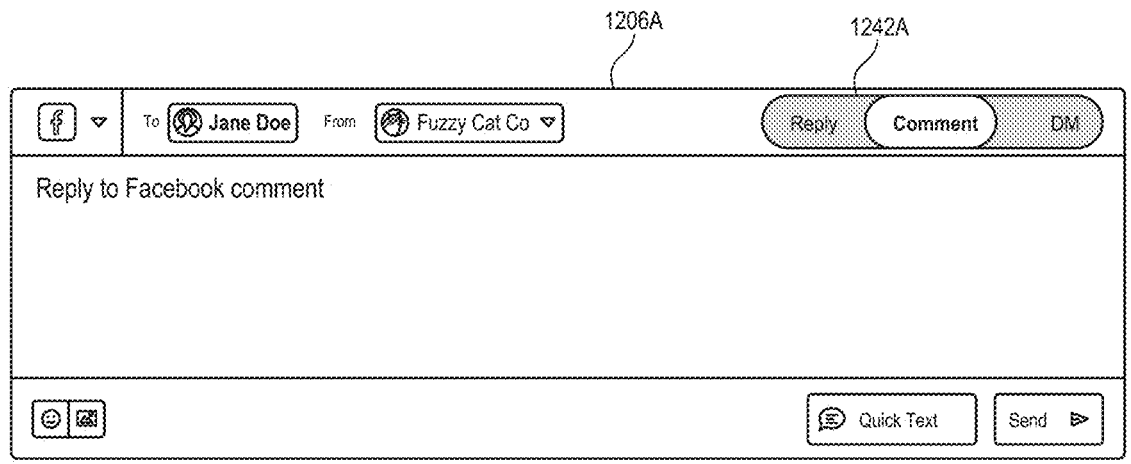
FIGS. 12A-12F illustrate screenshots of dynamic publisher windows with different message type toggle buttons, according to some embodiments.
Figure 12B:
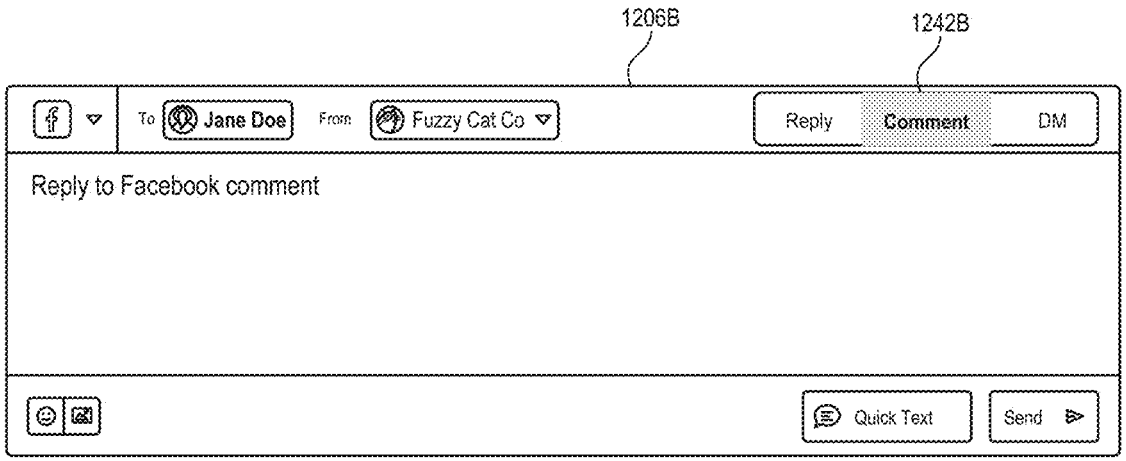
Figure 12C:
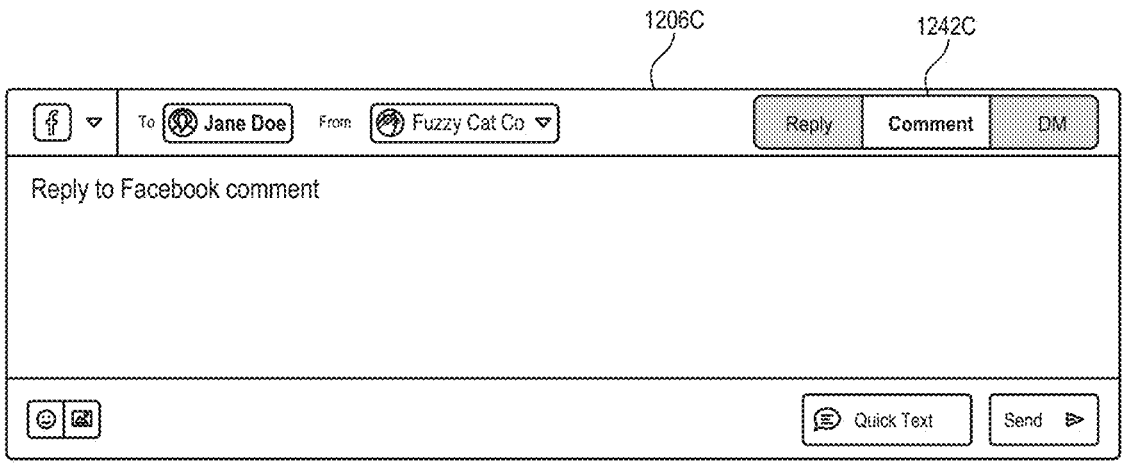
Figure 12D:
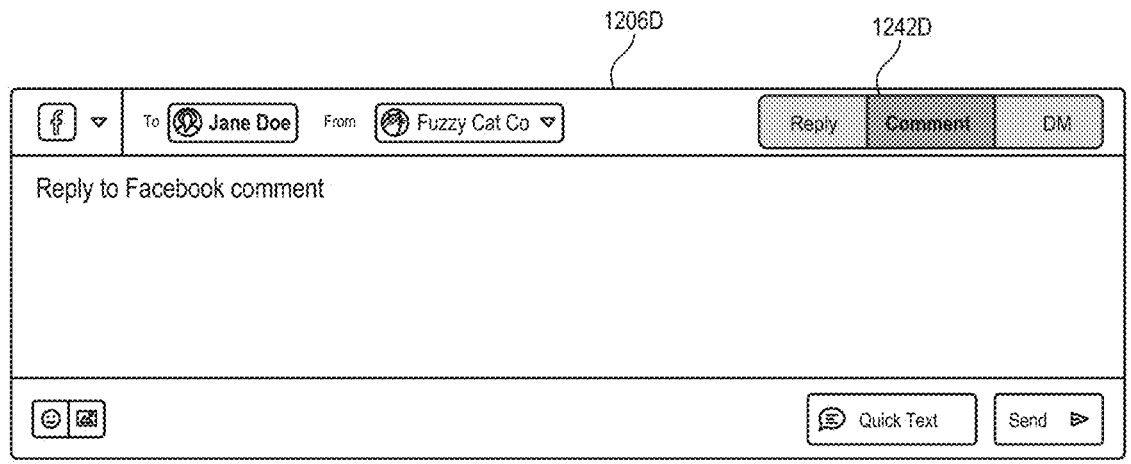
Figure 12E:
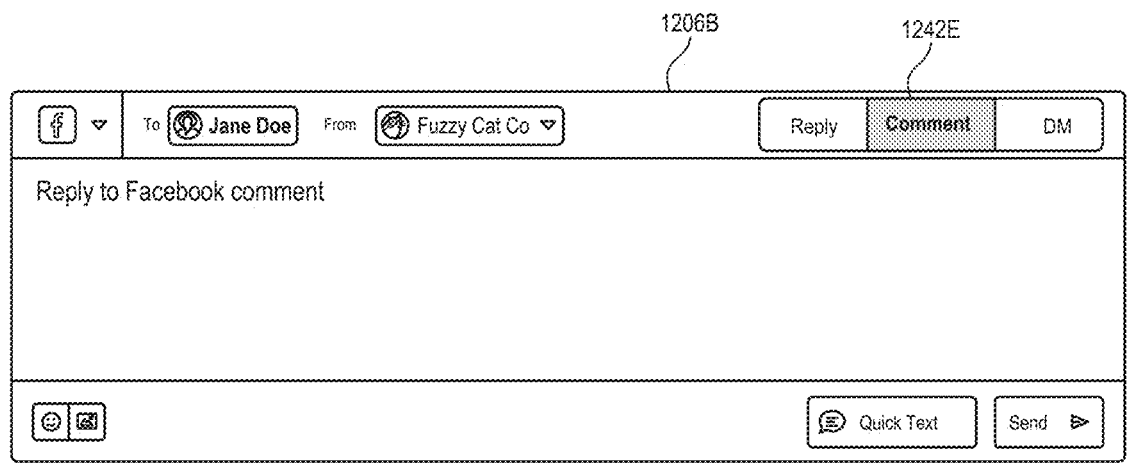
Figure 12F:
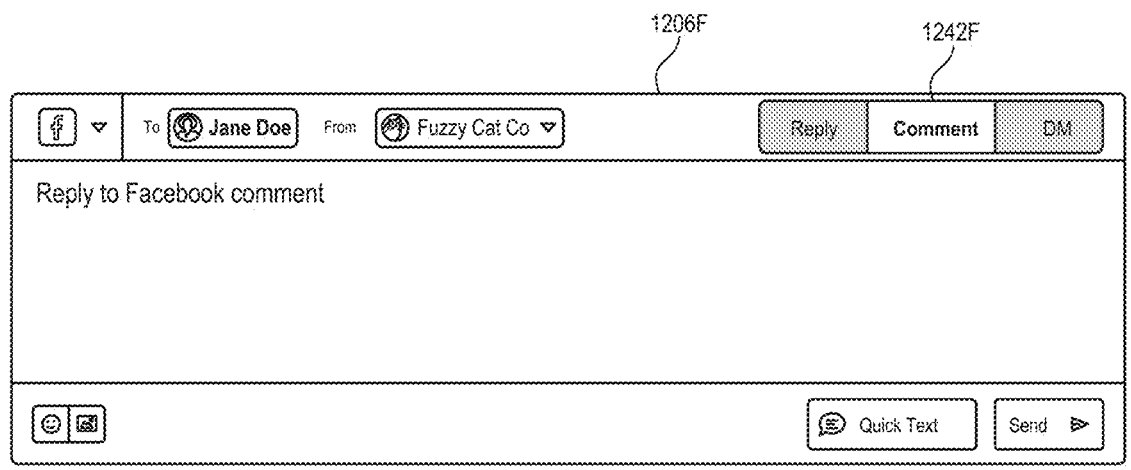

FIGS. 11A-11F illustrate screenshots of dynamic publisher windows 1106A-1106F with the fourth message type configuration for current channels 1026A-1026F, according to some embodiments. In some embodiments, each of dynamic publisher windows 1106A-1106F can include additional features that correspond to current channels 1126A-1126F, similar as FIGS. 5A-5F. For example, as shown in FIG. 11E, for current channel 1126E of Twitter, message window 1134E can include a character counter 1135E, and action types 1136E can include a link for the service agent to initiate direct message. After clicking on the link of action types 1136E, dynamic publisher window 1106E can switch to dynamic publisher window 1106F. message for current channel 1126F of Twitter to send by DM can only be sent to Twitter users who follow each other. When message type is switched to DM, action types 1136F can be updated to include more actions. Similar as FIG. 5F, message window 1134F for dynamic publisher window 1106F can include a warning message 1137F that "Due to direct message Twitter seetings, your message might not be received. Tweet a link for the user to initiate the message."

FIGS. 12A-12F illustrate screenshots of dynamic publisher windows 1206A-1206F with message type toggle buttons 1242A-1242F, according to some embodiments. In some embodiments, message type toggle buttons 1242A, 1242C, and 1242F can have current selected message type highlighted in white and other options grayed out. Message type toggle button 1242A can include an oval button to toggle between different message types. Message type toggle button 1242C can include a square button with round corners to toggle between different message types. Message type toggle button 1242F can include a square button with round corners and also have selected message type text highlighted in a different color, such as blue (not shown in FIG. 12F). In some embodiments, message type toggle buttons 1242B and 1242E can have current selected message type highlighted in gray and other options white out. Message type toggle buttons 1242B and 1242E can both include a square button with round corners but message type toggle buttons 1242B can have no outlines and message type toggle buttons 1242E can include outlines on highlighted message type. In some embodiments, message type toggle button 1242D can include a square button with round corners and have current selected message type highlighted with in darker gray and other options lighter gray.

Figure 13:
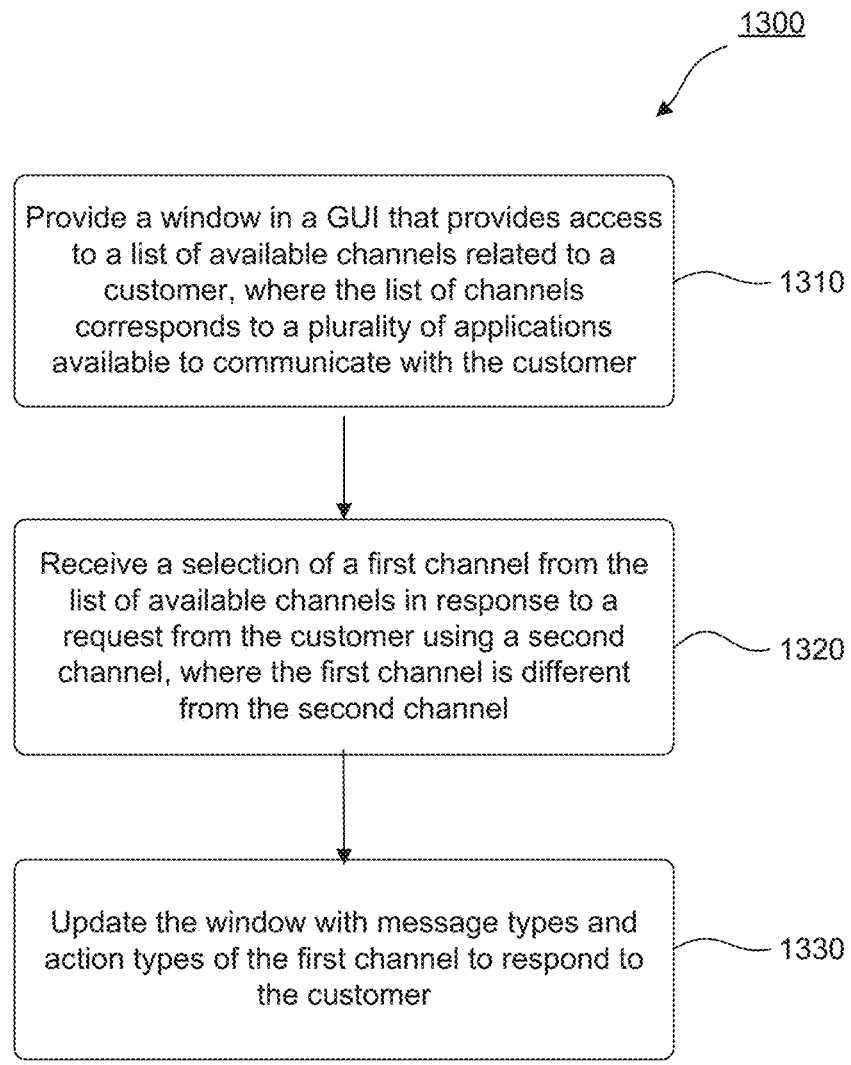
FIG. 13 illustrates a flowchart example for switching channel during communicating with customers via a dynamic publisher, according to some embodiments.

FIG. 13 illustrates a flowchart example for switching channel during communicating with customers via a dynamic publisher, according to some embodiments. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 13, as will be understood by a person of ordinary skill in the art. Method 1300 shall be described with reference to FIG. 1-FIG. 12F. However, method 1300 is not limited to the example embodiments.

At 1310, a window in a GUI is provided to provide access to a list of available channels related to a customer. The list of channels corresponds to a plurality of applications available to communicate with the customer. For example, in the GUI of FIG. 1, dynamic publisher window 106 can be provided. And dynamic publisher window 106 can include current channel 126 and a list of available channels after clicking on the down arrow. FIG. 2 displays channel list 244 that includes the available channels to communicate with the customer. These channels can correspond to a list of applications that the customer uses and are available for customer. And the available channels can be collected during prior interactions with the customer.

At 1320, a selection of a first channel from the list of available channels is received in response to a request from the customer using a second channel. And the first channel is different from the second channel. For example, as shown in FIG. 2, a different channel from current channel 226 can be selected to respond to the customer. Dynamic publisher window 206 can provide convenience and quick access to change to a different channel, thus reducing response time that the service agent responds to the customer.

At 1330, message types and actions corresponding to the first channel is updated to respond to the customer. For example, as shown in FIG. 2, message types 242 and action types 236 are updated for current channel 226 after selected. More message types and action types can also be added when corresponding application of current channel 226 is updated.

Figure 14:
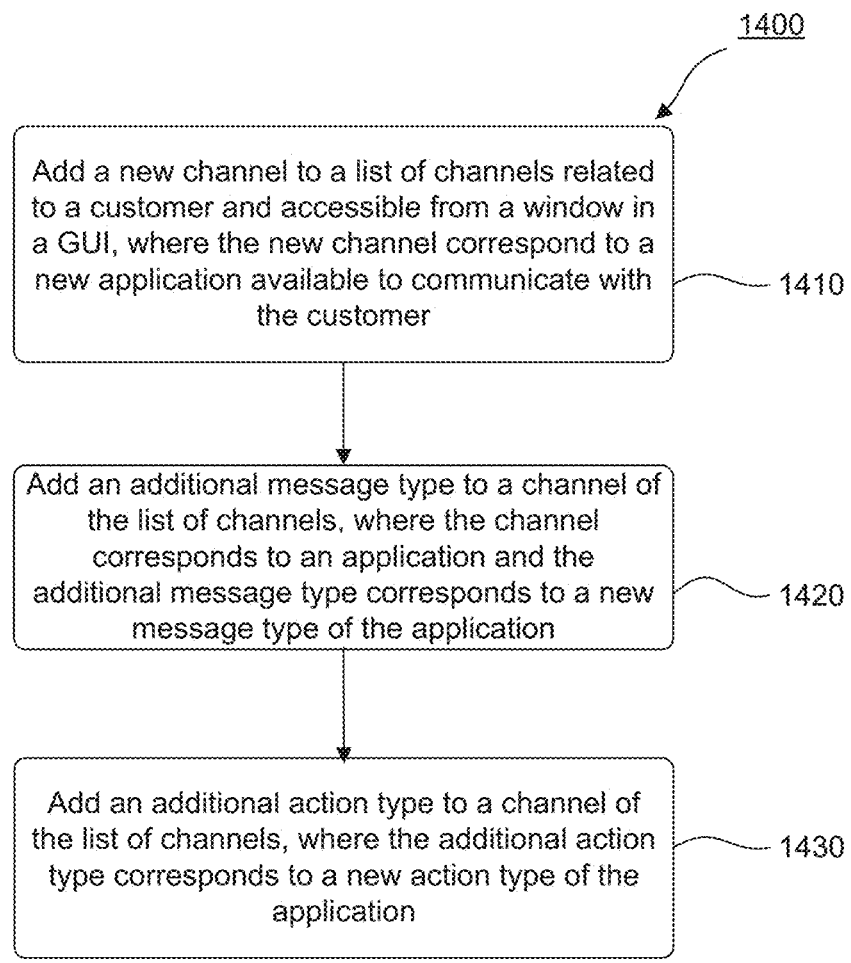
FIG. 14 illustrates a flowchart example for adding a new channel, a new message type, and a new action type in a dynamic publisher, according to some embodiments.

FIG. 14 illustrates a flowchart example for adding a new channel, a new message type, and a new action type in a dynamic publisher, according to some embodiments. Method 1400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 14, as will be understood by a person of ordinary skill in the art. Method 1400 shall be described with reference to FIG. 1-FIG. 12F. However, method 1400 is not limited to the example embodiments.

At 1410, a new channel is added to a list of channels that are related to a customer and accessible from a window in a GUI. The new channel corresponds to a new application available to communicate with the customer. For example, as shown in the GUI of FIG. 2, if the customer just communicated with the service agent through Facebook, Facebook channel can be added to channel list 244 in dynamic publisher 206.

At 1420, an additional message type is added to a channel of the list of channels. The channel corresponds to an application and the additional message type corresponds to a new message type of the application. For example, as shown in FIG. 4, if Facebook channel of channel list 444 adds a new message type of direct message (DM), message type toggle button 442 can add the new message type of DM in selected channel window 445.

At 1430, an additional action type is added to a channel of the list of channels. The channel corresponds to an application and the additional action type corresponds to a new action type of the application. For example, as shown in FIG. 3E, if current channel 326E of Twitter Post adds a new action type of adding links, action types 336E can add the new action type of adding links for user to initiate direct message in dynamic publisher window 306E.

Figure 15:
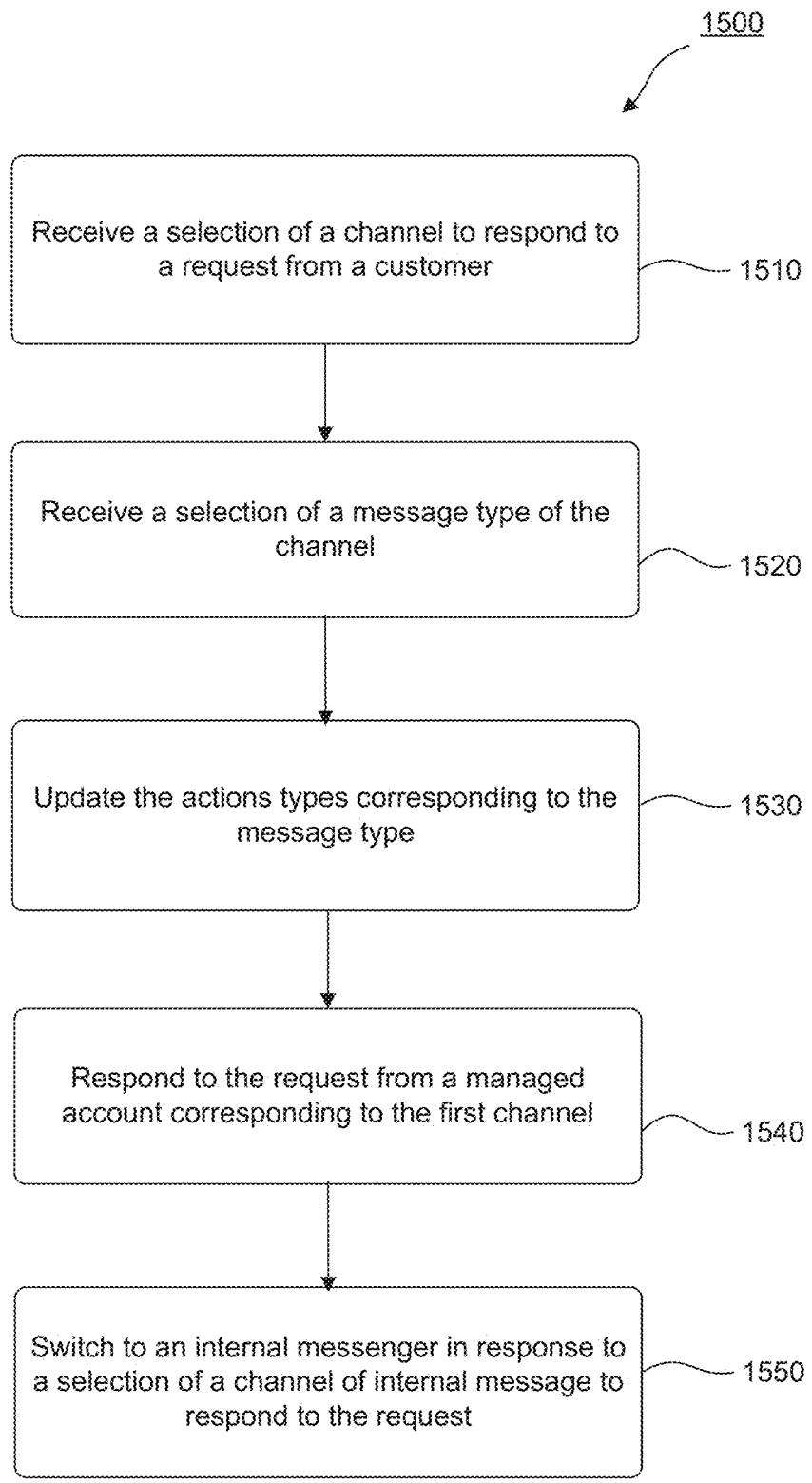
FIG. 15 illustrates a flowchart example for communicating with a customer via a dynamic publisher, according to some embodiments.

FIG. 15 illustrates a flowchart example for communicating with a customer via a dynamic publisher, according to some embodiments. Method 1500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 15, as will be understood by a person of ordinary skill in the art. Method 1500 shall be described with reference to FIG. 1-FIG. 12F. However, method 1500 is not limited to the example embodiments.

At 1510, a selection of a channel is received to respond to a request from a customer. For example, a customer may request the return label through SMS, as shown in the GUI of FIG. 1. A channel of Facebook 248-2 can be selected to respond to the customer's request, as shown in FIG. 4.

At 1520, a selection of message type of the channel is received. For example, as shown in FIG. 4, message type "Comment" can be selected by clicking on message type toggle button 442.

At 1530, action types corresponding to the message type are updated. For example, as shown in FIG. 4, action types 436, such as inserting emojis and pictures, corresponding to message type "Comment" can be updated in the dynamic publisher window.

Figure 3H:
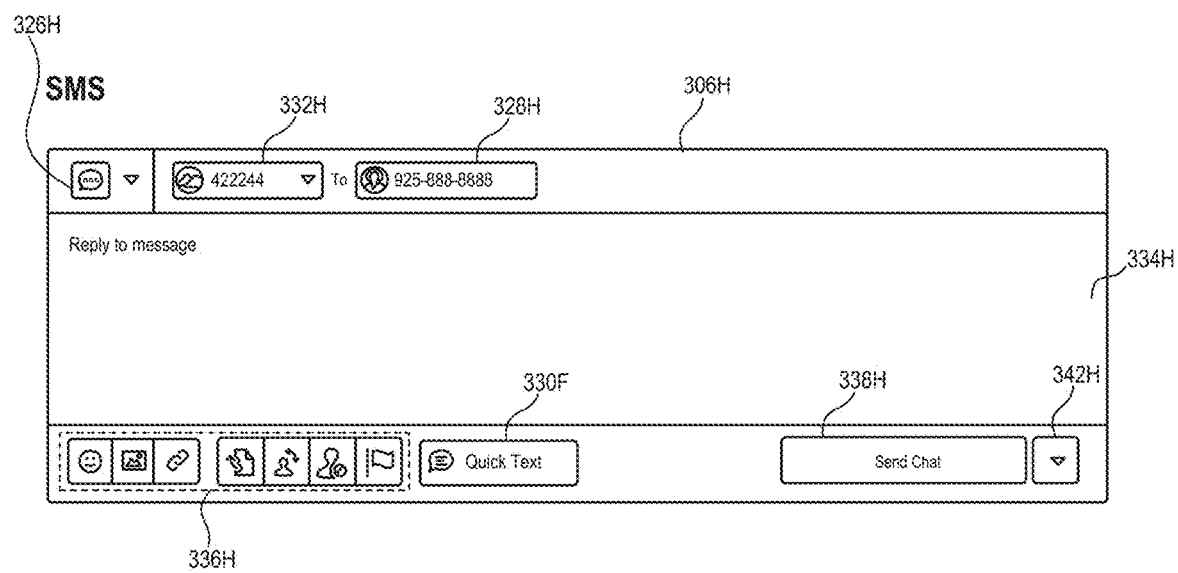

At 1540, the request is responded from a managed account. For example, as shown in FIG. 3A, the request of the customer can be responded from a managed account of "Fuzzy Cat Co." The managed account of "Fuzzy Cat Co" can be a corresponding Facebook account as Facebook channel is selected. If a different channel is selected, for example, as shown in FIG. 3H, a managed account of "422244" can be used to respond to the request of the customer through SMS channel.

At 1550, an internal messenger is switched to in response to a selection of a channel of internal message to respond to the request. For example, as shown in FIG. 3D, current channel 326D of internal notes can be switched to when the service agent selects internal message to acquire additional information to respond to the customer request. For example, the service agent may need customer order number from an internal sales team to prepare a return label for the customer.

Figure 16:
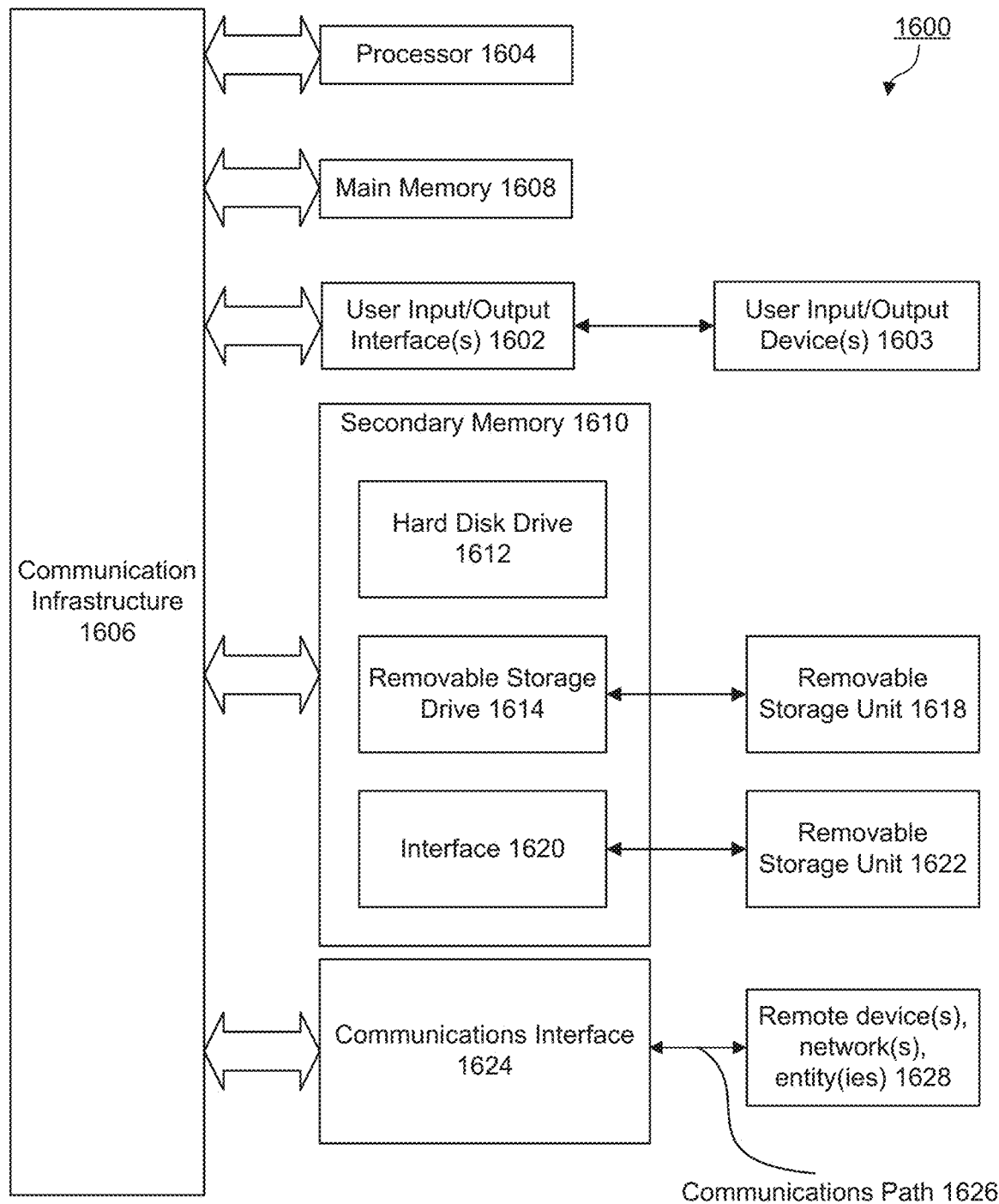
FIG. 16 illustrates an example computer system which may be used for implementing various embodiments presented herein.

FIG. 16 illustrates an example computer system useful for implementing various embodiments. Various embodiments shown in FIG. 1-FIG. 13F may be implemented, for example, using one or more well-known computer systems, such as computer system 1600 shown in FIG. 16. One or more computer systems 1600 may be used, for example, to implement any of the embodiments discussed herein, as well as combinations and sub-combinations thereof.

Computer system 1600 may include one or more processors (also called central processing units, or CPUs), such as a processor 1604. Processor 1604 may be connected to a communication infrastructure or bus 1606.

Computer system 1600 may also include user input/output device(s) 1603, such as monitors, keyboards, pointing devices, etc., which may communicate with communication infrastructure 1606 through user input/output interface(s) 1602.

One or more of processors 1604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 may also include a main (or primary) memory 1608, such as random access memory (RAM). Main memory 1608 may include one or more levels of cache. Main memory 1608 may have stored therein control logic (i.e., computer software) and/or data.

Computer system 1600 may also include one or more secondary storage devices or memory 1610. Secondary memory 1610 may include, for example, a hard disk drive 1612 or a removable storage device or drive 1614. Removable storage drive 1614 may be a floppy disk drive, a magnetic tape drive, a compact disk drive, an optical storage device, tape backup device, or any other storage device/drive.

Removable storage drive 1614 may interact with a removable storage unit 1618. Removable storage unit 1618 may include a computer usable or readable storage device having stored thereon computer software (control logic) or data. Removable storage unit 1618 may be a floppy disk, magnetic tape, compact disk, DVD, optical storage disk, or any other computer data storage device. Removable storage drive 1614 may read from or write to removable storage unit 1618.

Secondary memory 1610 may include other means, devices, components, instrumentalities, or other approaches for allowing computer programs or other instructions or data to be accessed by computer system 1600. Such means, devices, components, instrumentalities, or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 1600 may further include a communications or network interface 1624. Communications interface 1624 may enable computer system 1600 to communicate and interact with any combination of external devices, external networks, external entities, etc. (individually and collectively referenced by reference number 1628). For example, communications interface 1624 may allow computer system 1600 to communicate with external or remote devices 1628 over communications path 1626, which may be wired or wireless (or a combination thereof), and which may include any combination of LANs, WANs, the Internet, etc. Control logic or data may be transmitted to and from computer system 1600 via communications path 1626.

Computer system 1600 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 1600 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 1600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 16. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   providing, by a computing device, a publisher window in a graphical user interface (GUI), wherein the publisher window includes:
   a list of channels related to a customer, the list of channels corresponding to a plurality of applications available to communicate with the customer; and
   one or more message types and one or more action types corresponding to one or more of the list of channels;
   receiving, by the computing device, a selection of a first channel from the list of channels in the publisher window in response to a request from the customer using a second channel from the list of channels, wherein the first channel is different from the second channel; and
   updating, by the computing device, the one or more message types and the one or more action types in the publisher window corresponding to the first channel to respond to the request.

2. The method of claim 1, further comprising:
   adding, by the computing device, a third channel to the list of channels in the publisher window, wherein the third channel corresponds to a new application available to communicate with the customer.

3. The method of claim 1, further comprising:
   adding, by the computing device, an additional message type to the one or more message types of the first channel in the publisher window, wherein the first channel corresponds to an application in the plurality of applications and the additional message type corresponds to a new message type of the application.

4. The method of claim 1, further comprising:
   adding, by the computing device, an additional action type to the one or more action types of the first channel in the publisher window, wherein the first channel corresponds to an application in the plurality of applications and the additional action type corresponds to a new action type of the application.

5. The method of claim 1, further comprising:
   updating, by the computing device, the one or more action types in the publisher window in response to a selection of a message type.

6. The method of claim 1, further comprising:
   responding, by the computing device, to the request from a managed account, wherein the managed account corresponds to the first channel.

7. The method of claim 1, further comprising:
   switching, by the computing device, to an internal messenger in the publisher window in response to a selection of a channel of internal message to respond to the request.

8. A system, comprising:
   a memory; and
   at least one processor coupled to the memory, wherein the at least one processor is configured to:
   provide a publisher window in a graphical user interface (GUI), wherein the publisher window includes:
   a list of channels related to a customer, the list of channels corresponding to a plurality of applications available to communicate with the customer; and
   one or more message types and one or more action types corresponding to one or more of the list of channels;
   receive a selection of a first channel from the list of channels in the publisher window in response to a request from the customer using a second channel from the list of channels, wherein the first channel is different from the second channel; and
   update the one or more message types and the one or more action types in the publisher window corresponding to the first channel to respond to the request.

9. The system of claim 8, wherein the at least one processor is further configured to:
   add a third channel to the list of channels in the publisher window, wherein the third channel corresponds to a new application available to communicate with the customer.

10. The system of claim 8, wherein the at least one processor is further configured to:
    add an additional message type to the one or more message types of the first channel channels in the publisher window, wherein the first channel corresponds to an application in the plurality of applications and the additional message type corresponds to a new message type of the application.

11. The system of claim 8, wherein the at least one processor is further configured to:
    add an additional action type to the one or more action types of the first channel channels in the publisher window, wherein the first channel corresponds to an application in the plurality of applications and the additional action type corresponds to a new action type of the application.

12. The system of claim 8, wherein the at least one processor is further configured to:
    update the one or more action types channels in the publisher window in response to a selection of a message type.

13. The system of claim 8, wherein the at least one processor is further configured to:
    respond to the request from a managed account, wherein the managed account corresponds to the first channel.

14. The system of claim 8, wherein the at least one processor is further configured to:

switch to an internal messenger channel in the publisher window in response to a selection of a channel of internal messages to respond to the request.

15. A tangible computer-readable device having instructions stored thereon that, when executed by a computing device, cause the computing device to perform operations comprising:

providing a publisher window in a graphical user interface (GUI), wherein the publisher window includes:

a list of channels related to a customer, the list of channels corresponding to a plurality of applications available to communicate with the customer; and one or more message types and one or more action types corresponding to one or more of the list of channels;

receiving a selection of a first channel from the list of channels in the publisher window in response to a request from the customer using a second channel from the list of channels, wherein the first channel is different from the second channel; and updating the one or more message types and the one or more action types in the publisher window corresponding to the first channel to respond to the request.

16. The computer-readable device of claim 15, the operations further comprising:

adding a third channel to the list of channels in the publisher window, wherein the third channel corresponds to a new application available to communicate with the customer.

17. The computer-readable device of claim 15, the operations further comprising:

adding an additional action type to the one or more action types of the first channel in the publisher window, wherein the first channel corresponds to an application in the plurality of applications and the additional action type corresponds to a new action type of the application.

18. The computer-readable device of claim 15, the operations further comprising:

updating the one or more action types in the publisher window in response to a selection of a message type.

19. The computer-readable device of claim 15, the operations further comprising:

responding to the request from a managed account selected, wherein the managed account corresponds to the first channel.

20. The computer-readable device of claim 15, the operations further comprising:

switching to an internal messenger in the publisher window in response to a selection of a channel of internal message to respond to the request.

* * * * *